US012782762B2

(12) United States Patent
Bilodeau

(10) Patent No.: US 12,782,762 B2
(45) Date of Patent: Nov. 3, 2026

(54) PHASE SHIFTER FOR LOW OPTICAL LOSS IN OPTICAL COMMUNICATIONS SYSTEMS

(71) Applicant: TAARA CONNECT, INC., Sunnyvale, CA (US)

(72) Inventor: Simon Bilodeau, Mountain View, CA (US)

(73) Assignee: TAARA CONNECT, INC., Sunnyvale, CA (US)

( * ) Notice: Subject to any disclaimer, the term of this patent is extended or adjusted under 35 U.S.C. 154(b) by 360 days.

(21) Appl. No.: 18/162,106

(22) Filed: Jan. 31, 2023

(65) Prior Publication Data

US 2024/0201523 A1 Jun. 20, 2024

Related U.S. Application Data

(60) Provisional application No. 63/432,526, filed on Dec. 14, 2022.

(51) Int. Cl.
*G02F 1/025* (2006.01)
*H04B 10/61* (2013.01)

(52) U.S. Cl.
CPC ......... *G02F 1/025* (2013.01); *H04B 10/6165* (2013.01); *G02F 2203/50* (2013.01)

(58) Field of Classification Search
CPC ............................ G02F 1/025; H04B 10/6165
See application file for complete search history.

(56) References Cited

U.S. PATENT DOCUMENTS 7,251,408 B1 7/2007 Gunn et al.
7,747,122 B2 6/2010 Shetrit et al.
9,239,506 B2 1/2016 Manouvrier
9,329,415 B2 5/2016 Song et al.
9,515,198 B1 * 12/2016 Ning ..................... G01R 33/09
(Continued)

FOREIGN PATENT DOCUMENTS

CN 118090600 A * 5/2024 ............. G01N 29/04
WO 2020234098 A1 11/2020

OTHER PUBLICATIONS

Ashour, "Efficient Refractive Index Modulation in an Open Access Silicon Photonic Platform", Dissertation submitted for the degree of Doctor of Natural Science, University of Konstanz, 195 Pages, (2021).

(Continued)

*Primary Examiner* — Tina Wong
(74) *Attorney, Agent, or Firm* — Botos Churchill IP Law

(57) ABSTRACT

Aspects of the disclosure provide phase shifters as well as systems and methods in which those phase shifters may be utilized. For instance, a system may include a first communications terminal. The first optical communications terminal may include an optical phased array (OPA) architecture including a plurality of phase shifters configured to receive an optical communications beam from a second communications terminal. The plurality of phase shifters includes a first phase shifter consisting of silicon having a slab-contacted NPN junction scheme geometry. The first phase shifter may have a PN junction distance from waveguide center within a range 100 nm to 2 μm, inclusive, and a waveguide core width dimension within a range 500 mm to 2 μm, inclusive. The system may also include the second optical communications terminal.

17 Claims, 30 Drawing Sheets

100

(56) References Cited

U.S. PATENT DOCUMENTS

| | | | | |
|---|---|---|---|---|
| 10,216,016 | B2 | 2/2019 | Lee et al. | |
| 10,663,662 | B1 * | 5/2020 | Gehl | G02B 6/122 |
| 2003/0035609 | A1 * | 2/2003 | Hatanaka | G02B 6/122 385/27 |
| 2012/0063714 | A1 | 3/2012 | Park et al. | |
| 2013/0028555 | A1 * | 1/2013 | Dailey | G01D 5/35316 385/12 |
| 2014/0355925 | A1 | 12/2014 | Manouvrier | |
| 2015/0049998 | A1 * | 2/2015 | Dumais | G02B 6/04 385/115 |
| 2018/0210242 | A1 | 7/2018 | Baehr-Jones et al. | |
| 2018/0364502 | A1 | 12/2018 | Baehr-Jones et al. | |
| 2019/0386453 | A1 * | 12/2019 | Schmid | H01S 5/0422 |
| 2021/0072614 | A1 | 3/2021 | Yoo et al. | |
| 2022/0011111 | A1 * | 1/2022 | Paniccia | G01C 19/661 |
| 2022/0238646 | A1 * | 7/2022 | Levy | H10D 84/401 |
| 2022/0350179 | A1 * | 11/2022 | Pishvaibazargani | G02F 1/0151 |

OTHER PUBLICATIONS

Lindecrantz, et al., "Estimation of Propagation Losses for Narrow Strip and Rib Waveguides", IEEE Photonics Technology Letters, vol. 26, No. 18, pp. 1836-1839 (2014), doi: 10.1109/LPT.2014.2337055.

Soref, et al., "Electrooptical Effects in Silicon", IEEE Journal of Quantum Electronics, vol. 23, No. 1, pp. 123-129, (1987), doi: 10.1109/JQE.1987.1073206.

International Search Report and Written Opinion for corresponding International Application No. PCT/US2023/029843 dated Nov. 8, 2023 (15 pages).

* cited by examiner

100

200

400

2330

2500

PHASE SHIFTER FOR LOW OPTICAL LOSS IN OPTICAL COMMUNICATIONS SYSTEMS

CROSS REFERENCE TO RELATED APPLICATIONS

The present application claims the benefit of the filing date of U.S. Provisional Application No. 63/432,526, filed Dec. 14, 2022, the entire disclosure of which is incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to an aperture of a communications terminal at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits of adaptive-optics, point-to-multipoint support, and mesh network topologies. Each active element in the OPA requires electro-optic phase shifting capability.

BRIEF SUMMARY

Aspects of the disclosure provide a phase shifter consisting of silicon. The phase shifter has a slab-contacted NPN junction scheme geometry; a PN junction distance from waveguide center within a range 100 nm to 2 μm, inclusive; and a waveguide core width dimension within a range 500 nm to 2 μm, inclusive.

In one example, the phase shifter is configured to operate under depletion modulation. In another example, the phase shifter includes a maximum optical loss on the order of 3 dB (decibels) or less. In another example, slab-contacted NPN junction scheme geometry includes a single rib portion protruding from a slab portion. In this example, the rib portion and the slab portion each include each of which include continuous $N_a$ and $N_d$ regions. In another example, the phase shifter has a doping density in a range of $10^{16}$ $cm^{-3}$ to $10^{17}$ $cm^{-3}$. In another example, the phase shifter has a dynamic switching energy of the phase shifter is less than 0.1 mWatt. In another example, the phase shifter has an acceptor concertation $N_A$ which ranges from $10^{16}$ to $10^{18}$ $cm^{-3}$ inclusive. In this example, the phase shifter has a donor concentration $N_D$ which ranges from $10^{16}$ to $10^{18}$ $cm^{-3}$, inclusive.

Another aspect of the disclosure provides a system. The system includes a first communications terminal comprising: an optical phased array (OPA) architecture including a plurality of phase shifters configured to receive an optical communications beam from a second communications terminal, wherein the plurality of phase shifters includes a first phase shifter consisting of silicon. The first phase shifter has a slab-contacted NPN junction scheme geometry; a PN junction distance from waveguide center within a range 100 nm to 2 μm, inclusive; and a waveguide core width dimension within a range 500 nm to 2 μm, inclusive In one example, the system also includes the second optical communications terminal, the second optical communications terminal having a second OPA architecture including a plurality of phase shifters configured to receive an optical communications beam from the first communications terminal, wherein the plurality of phase shifters includes a second phase shifter consisting of silicon. In this example, the second phase shifter has a PN junction distance from waveguide center within a range 100 nm to 2 μm, inclusive and a waveguide core width dimension within a range 500 nm to 2 μm, inclusive.

Another aspect of the disclosure provides a method. The method includes receiving, at a first communications terminal, light through an aperture; passing the received light to a phase shifter of an OPA architecture, the phase shifter consisting of silicon and having (1) a slab-contacted NPN junction scheme geometry, (2) a PN junction distance from waveguide center within a range 100 nm to 2 μm, inclusive, and (3) a waveguide core width dimension within a range 500 nm to 2 μm, inclusive; providing, using the phase shifter, the received light to receiver components including a sensor; receiving, using the phase shifter, light to be transmitted; and transmitting the light to be transmitted through the aperture and to a second communications terminal.

DETAILED DESCRIPTION

Overview

The technology described herein relates to phase shifters which may be used in OPA architectures for optical communications systems. In some instances, the phase shifters may include OP Pure SOI silicon photonic phase shifters, or rather, without the integration of nonstandard materials and may leverage thermo-optic or free carrier dispersion effects.

While the thermo-optic effect is strong in silicon, creating temperature gradients involves significant power dissipation, which is energy-inefficient and increases crosstalk (and therefore control complexity) for systems with large numbers of densely-integrated components. Thermal engineering techniques such as undercuts and trench isolation can improve the efficiency, and hence reduce power, at the cost of decreased bandwidth, which is already low (~100 kHz).

At the other extreme, PN junction modulators, which use a change in local free carrier density and the associated optical dispersion in silicon, can, when operated in depletion mode, offer RC-limited time constants in the 10s of GHz and low power operation due to their capacitive nature. However, their index modulation is weaker and comes with free carrier absorption, leading to higher phase-shift (e.g., lower loss), lower or comparable absorption, degrading loss figures-of-merit (FOMs).

The features described herein may provide phase shifters with depletion-mode modulator geometries. While there may be some sacrifice speed, there may be notable increases in various other aspects. The phase shifter described herein may require high (e.g., $10^{16}$ $cm^{-3}$, where $cm^{-3}$ corresponds to a unit of $1/cm^{-3}$) to low (e.g., $10^{17}$ $cm^{-3}$) doping densities for optimally low-loss operation for select waveguide geometries, with maximum optical losses expected to be down to 3 dB (decibels) or less. The functional attributes of the phase shifter may be assessed via various FOMs, including lower phase shift-loss and lower or comparable absorption. The switching speed of the device may be engineered by controlling the frequency at which p-doped rails segment the phase shifter, he linearity of the switching can also be controlled via junction placement, doping, and waveguide geometry, and the phase shifter can be used for optimization of phase shifter length as a trade with optical loss in situations phase shifter size has an impact on overall performance of the communications terminal.

Example Systems

Figure 1:
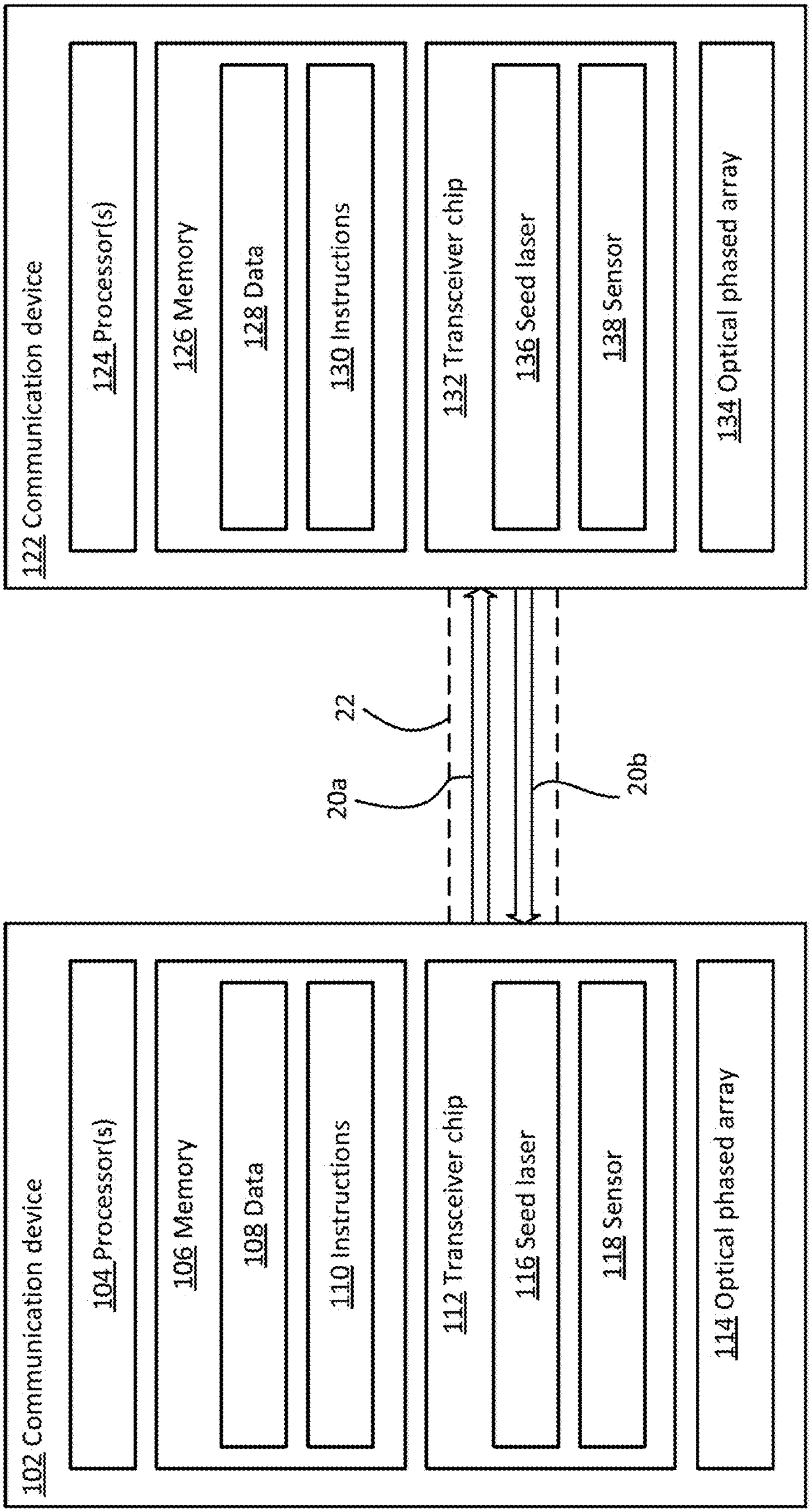
FIG. 1 is a block diagram 100 of a first communications terminal and a second communications terminal in accordance with aspects of the disclosure.
Figure 2:
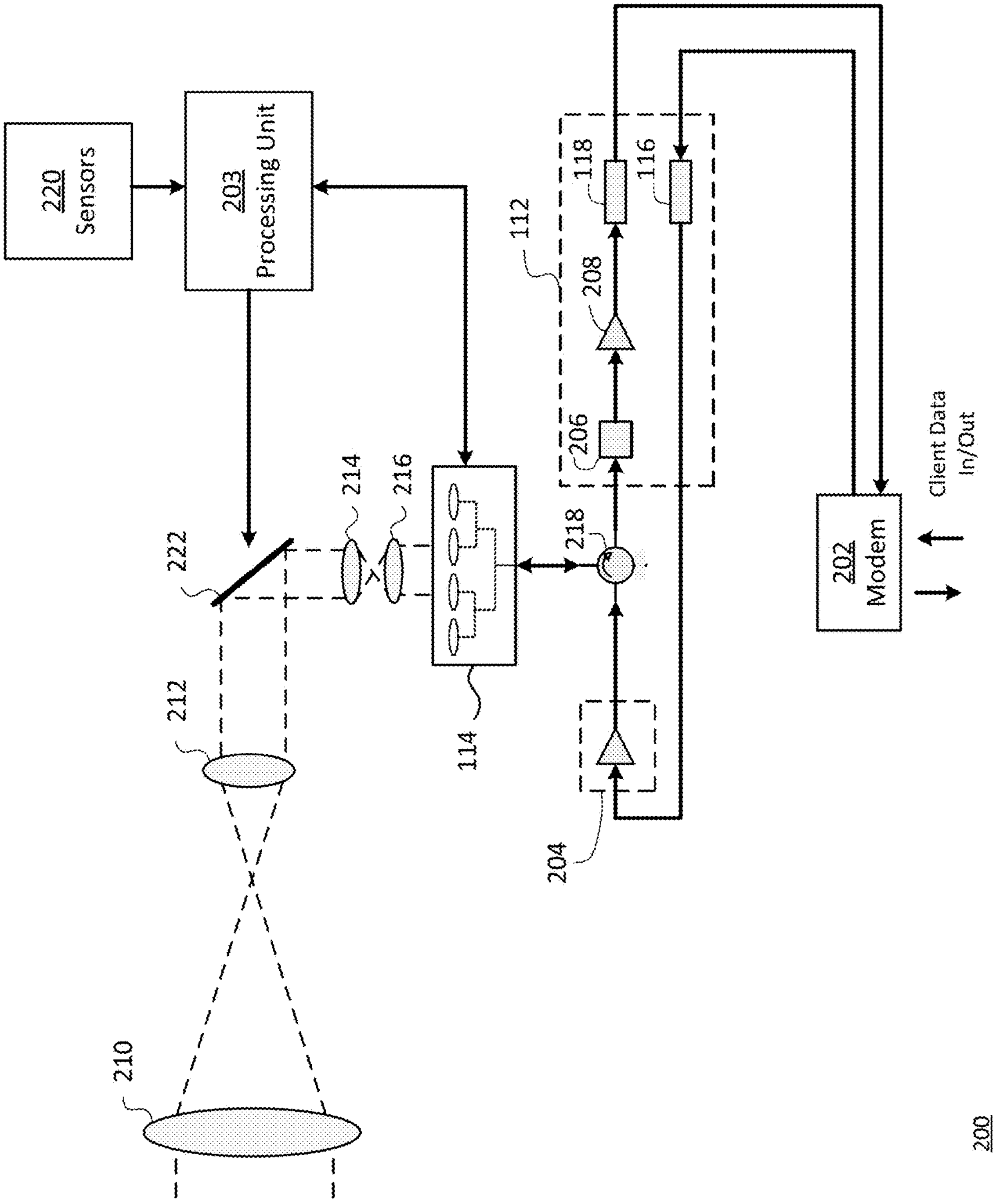
FIG. 2 is a pictorial diagram 200 of an example system architecture for the first communication device of FIG. 1 in accordance with aspects of the disclosure.

FIG. 1 is a block diagram 100 of a first communications terminal configured to form one or more links with a second communications terminal, for instance as part of a system such as a free-space optical communication (FSOC) system. FIG. 2 is a pictorial diagram 200 of an example communications terminal, such as the first communications terminal of FIG. 1. For example, a first communications terminal 102 includes one or more processors 104, a memory 106, a transceiver photonic integrated chip 112, and an optical phased array (OPA) architecture 114. In some implementations, the first communications terminal 102 may include more than one transceiver chip and/or more than one OPA architecture (e.g., more than one OPA chip).

The one or more processors 104 may be any conventional processors, such as commercially available CPUs. Alternatively, the one or more processors may be a dedicated device such as an application specific integrated circuit (ASIC) or another hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communications terminal, such as memory 106, calibration information, such as one or more offsets determined for tracking a signal, may be stored.

Data 108 may be retrieved, stored or modified by one or more processors 104 in accordance with the instructions 110. For instance, although the system and method are not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps including of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), light-emitting diode (LED), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA architecture 114.

The receiver components may include at minimum a sensor 118, such as a photodiode. The sensor may convert a received signal (e.g., light or optical communications beam), into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the OPA architecture 114. The OPA architecture may include a micro-lens array, an emitter associated with each micro-lens in the array, a plurality of phase shifters, and waveguides that connect the components in the OPA. The OPA architecture may be positioned on a single chip, an OPA chip. The waveguides progressively merge between a plurality of emitters and an edge coupler that connect to other transmitter and/or receiver components. In this regard, the waveguides may direct light between photodetectors or fiber outside of the OPA architecture, the phase shifters the waveguide combiners, the emitters and any additional component within the OPA. In particular, the waveguide configuration may combine two waveguides at each stage, which means the number of waveguides is reduced by a factor of two at every successive stage closer to the edge coupler. The point of combination may be a node, and a combiner may be at each node. The combiner may be a 2×2 multimode interference (MMI) or directional coupler.

The OPA architecture 114 may receive light from the transmitter components and outputs the light as a coherent communications beam to be received by a remote communications terminal, such as second communications terminal 122. The OPA architecture 114 may also receive light from free space, such as a communications beam from second communications terminal 122, and provides such received light to the receiver components. The OPA architecture may provide the necessary photonic processing to combine an incoming optical communications beam into a single-mode waveguide that directs the beam towards the transceiver chip 112. In some implementations, the OPA architecture may also generate and provide an angle of arrival estimate to the one or more processors 104, such as those in processing unit 203.

The first communications terminal 102 may include additional components to support functions of the communications terminal. For example, the first communications terminal may include one or more lenses and/or mirrors that form a telescope. The telescope may receive collimated light and output collimated light. The telescope may include an objective portion, an eyepiece portion, and a relay portion. As shown in FIG. 2, the first communications terminal may include a telescope including an objective lens 210, an eyepiece lens 212, and an aperture 214 (or opening) through which light may enter and exit the communications terminal. For ease of representation and understanding, the aperture 214 is depicted as distinct from the first lens 210, though the first lens may be positioned within the aperture. The first communications terminal may include a circulator, such as a single mode circulator 218, that routes incoming light and outgoing light while keeping them on at least partially separate paths. The first communications terminal may include one or more sensors 220 for detecting measurements of environmental features and/or system components.

The first communications terminal 102 may include one or more steering mechanisms, such as one or more bias means for controlling one or more phase shifters, which may be part of the OPA architecture 114, and/or an actuated/steering mirror (not shown), such as a fast/fine pointing mirror. In some examples, the actuated mirror may be a MEMS 2-axis mirror, 2-axis voice coil mirror, or a piezoelectric 2-axis mirror. The one or more processors 104, such as those in the processing unit 203, may be configured to receive and process signals from the one or more sensors 220, the transceiver chip 112, and/or the OPA architecture 114 and to control the one or more steering mechanisms to adjust a pointing direction and/or wavefront shape. The first communications terminal also includes optical fibers, or waveguides, connecting optical components, creating a path between the seed laser 116 and OPA architecture 114 and a path between the OPA architecture 114 and the sensor 118.

Returning to FIG. 1, the second communications terminal 122 may output the Tx signals as an optical communications beam **20*b* (e.g., light) pointed towards the first communications terminal 102, which receives the optical communications beam 20*b* (e.g., light) as corresponding Rx signals. In this regard, the second communications terminal 122 include one or more processors, 124, a memory 126, a transceiver chip 132, and an OPA architecture 134. The one or more processors 124 may be similar to the one or more processors 104** described above.

Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA architecture 134 of the second communications terminal 122 may be similar to the transceiver chip 112 and the OPA architecture 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA architecture 134 may include an OPA chip including a micro-lens array, a plurality of emitters, a plurality of phase shifters. Additional components for supporting functions of the communications terminal 122 may be included similar to the additional components described above. The communications terminal 122 may have a system architecture that is same or similar to the system architecture shown in FIG. 2.

Figure 3:
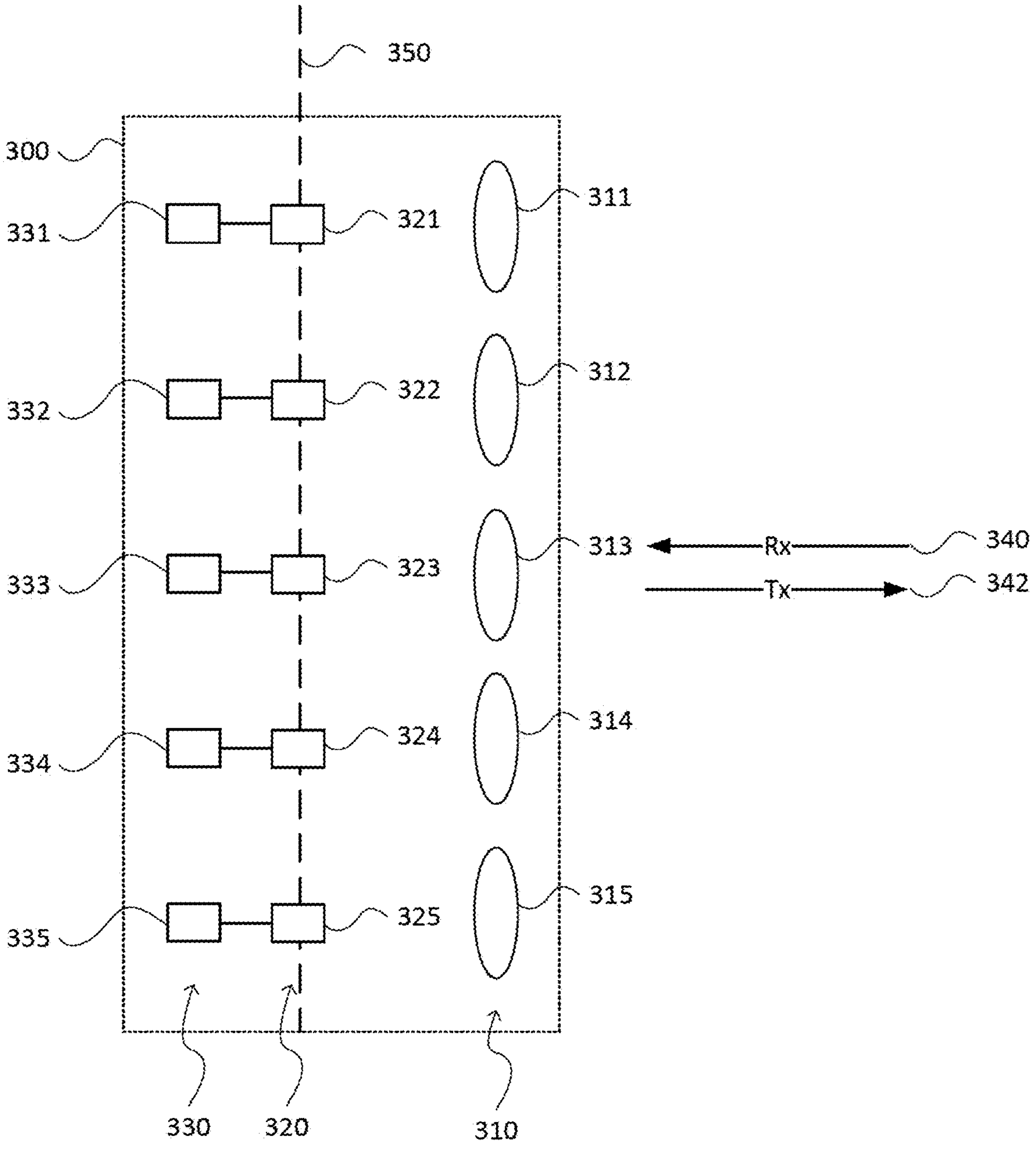
FIG. 3 represents features of an OPA architecture represented as an example OPA chip in accordance with aspects of the disclosure.

FIG. 3 represent features of OPA architecture 114 represented as an example OPA chip 300 including representations of a micro-lens array 310, a plurality of emitters 320, and a plurality of phase shifters 330. For clarity and ease of understanding, additional waveguides and other features are not depicted. Arrows 340, 342 represent the general direction of Tx signals (transmitted optical communications beam) and Rx signals (received optical communications beam) as such signals pass or travel through the OPA chip 300.

The micro-lens array 310 may include a plurality of convex lenses 311-315 that focus the Rx signals onto respective ones of the plurality emitters positioned at the focal points of the micro-lens array. In this regard, the dashed-line 350 represents the focal plane of the micro-lenses 311-315 of the micro-lens array 310. The micro-lens array 310 may be arranged in a grid pattern with a consistent pitch, or distance, between adjacent lenses. In other examples, the micro-lens array 310 may be in different arrangements having different numbers of rows and columns, different shapes, and/or different pitch (consistent or inconsistent) for different lenses.

Each micro-lens of the micro-lens array may be 10's to 100's of micrometers in diameter and height. In addition, each micro-lens of the micro-lens array may be manufactured by molding, printing, or etching a lens directly into a wafer of the OPA chip 300. Alternatively, the micro-lens array 310 may be molded as a separately fabricated micro-lens array. In this example, the micro-lens array 310 may be a rectangular or square plate of glass or silica a few mm (e.g. 10 mm or more or less) in length and width and 0.2 mm or more or less thick. Integrating the micro-lens array within the OPA chip 300 may allow for the reduction of the grating emitter size and an increase in the space between emitters. In this way, two-dimensional waveguide routing in the OPA architecture may better fit in a single layer optical phased array. In other instances, rather than a physical micro-lens array, the function of the micro-lens array may be replicated using an array of diffractive optical elements (DOE).

Each micro-lens of the micro-lens array may be associated with a respective emitter of the plurality of emitters 320. For example, each micro-lens may have an emitter from which Tx signals are received and to which the Rx signals are focused. As an example, micro-lens 311 is associated with emitter 321. Similarly, each micro-lens 312-315 also has a respective emitter 322-325. In this regard, for a given pitch (i.e., edge length of a micro-lens) the micro-lens focal length may be optimized for best transmit and receive coupling to the underlying emitters. This arrangement may thus increase the effective fill factor of the Rx signals at the respective emitter, while also expanding the Tx signals received at the micro-lenses from the respective emitter before the Tx signals leave the OPA chip 300.

The plurality of emitters 320 may be configured to convert emissions from waveguides to free space and vice versa. The emitters may also generate a specific phase and intensity profile to further increase the effective fill factor of the Rx signals and improve the wavefront of the Tx signals. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the gaussian intensity profile of traditional grating emitters. However, in some implementations, the emitters may be Gaussian field profile grating emitters.

The phase shifters 330 may allow for sensing and measuring Rx signals and the altering of Tx signals to improve signal strength optimally combining an input wavefront into a single waveguide or fiber. Each emitter may be associated with a phase shifter. As shown in FIG. 3, each emitter may be connected to a respective phase shifter. As an example, the emitter 320 is associated with a phase shifter 330. The Rx signals received at the phase shifters 331-335 may be provided to receiver components including the sensor 118, and the Tx signals from the phase shifters 331-335 may be provided to the respective emitters of the plurality of emitters 320. The architecture for the plurality of phase shifters 330 may include at least one layer of phase shifters having at least one phase shifter connected to an emitter of the plurality of emitters 320. In some examples, the phase shifter architecture may include a plurality of layers of phase shifters, where phase shifters in a first layer may be connected in series with one or more phase shifters in a second layer.

A communication link 22 may be formed between the first communications terminal 102 and the second communications terminal 122 when the transceivers of the first and second communications terminals are aligned. The alignment can be determined using the optical communications beams 20*a*, 20*b* to determine when line-of-sight is established between the communications terminals 102, 122. Using the communication link 22, the one or more processors 104 can send communication signals using the optical communications beam 20*a* to the second communications terminal 122 through free space, and the one or more processors 124 can send communication signals using the optical communications beam 20*b* to the first communications terminal 102 through free space. The communication link 22 between the first and second communications terminals 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

Figure 4:
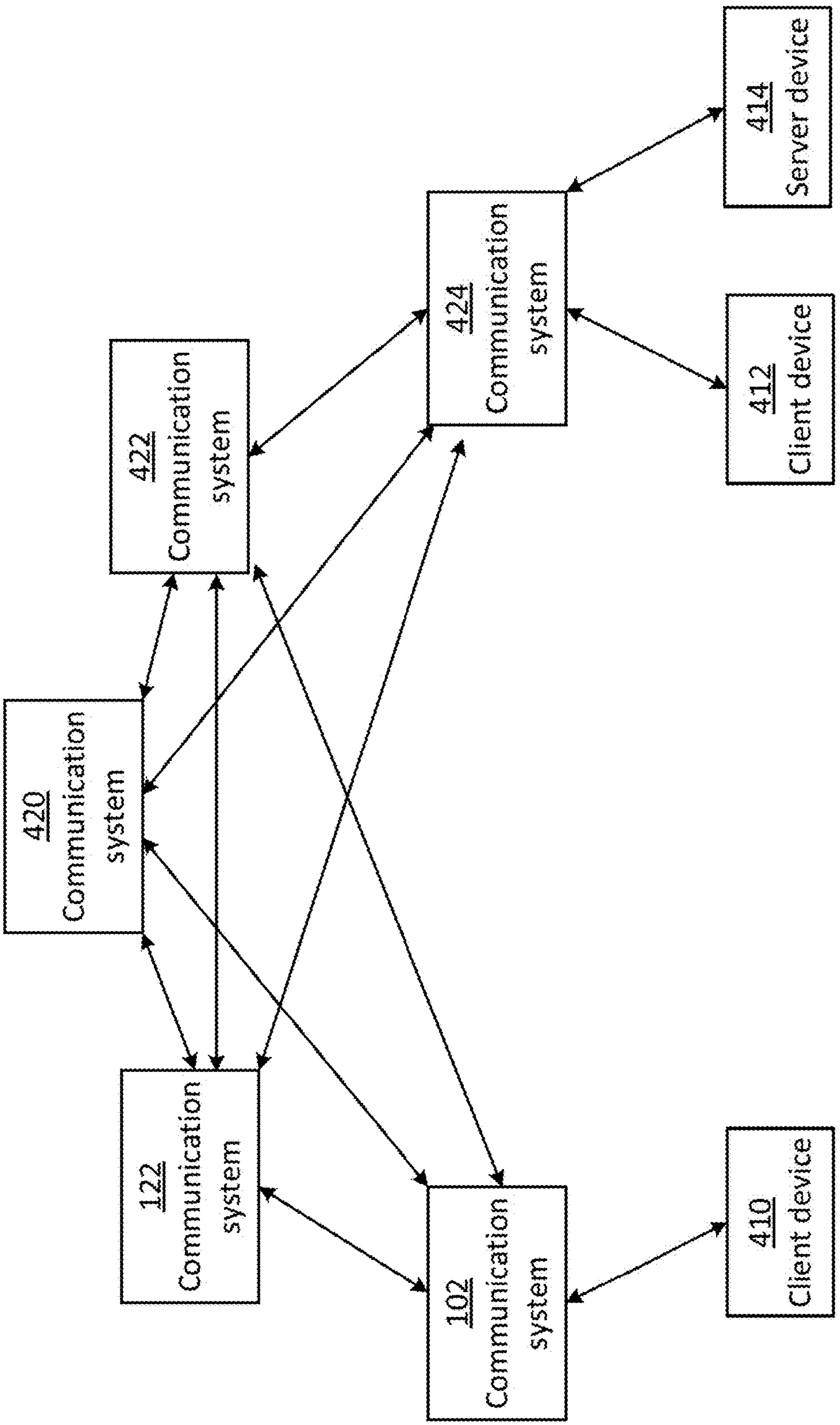
FIG. 4 is a pictorial diagram of a network in accordance with aspects of the disclosure.

As shown in FIG. 4, a plurality of communications terminals, such as the first communications terminal 102 and the second communications terminal 122, may be configured to form a plurality of communication links (illustrated as arrows) between a plurality of communications terminals, thereby forming a network 400. The network 400 may include client devices 410 and 412, server device 414, and communications terminals 102, 122, 420, 422, and 424. Each of the client devices 410, 412, server device 414, and communications terminals 420, 422, and 424 may include one or more processors, a memory, a transceiver chip, and an OPA architecture (e.g., OPA chip or chips) similar to those described above. Using the transmitter and the receiver, each communications terminal in network 400 may form at least one communication link with another communications terminal, as shown by the arrows. The communication links may be for optical frequencies, radio frequencies, other frequencies, or a combination of different frequency bands. In FIG. 4, the communications terminal 102 is shown having communication links with client device 410 and communications terminals 122, 420, and 422. The communications terminal 122 is shown having communication links with communications terminals 102, 420, 422, and 424.

The network 400 as shown in FIG. 4 is illustrative only, and in some implementations the network 400 may include additional or different communications terminals. The network 400 may be a terrestrial network where the plurality of communications terminals is on a plurality of ground communications terminals. In other implementations, the network 400 may include one or more high-altitude platforms (HAPs), which may be balloons, blimps or other dirigibles, airplanes, unmanned aerial vehicles (UAVs), satellites, or any other form of high-altitude platform, or other types of moveable or stationary communications terminals. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network.

Example Phase Shifter

Figure 5A:
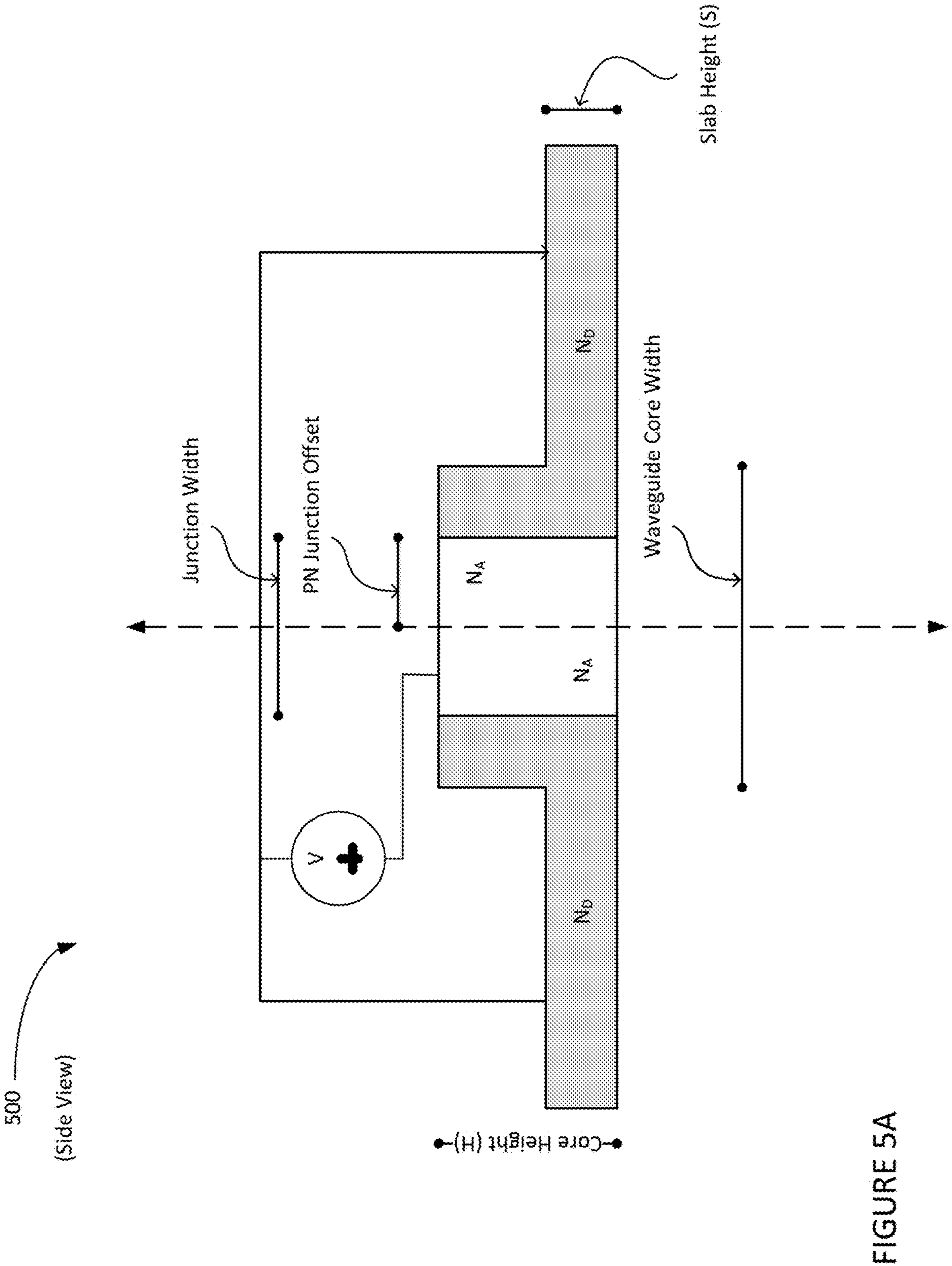
FIGS. 5A-5C provide example representative views of the architecture of a phase shifter in accordance with aspects of the disclosure.
Figure 5B:
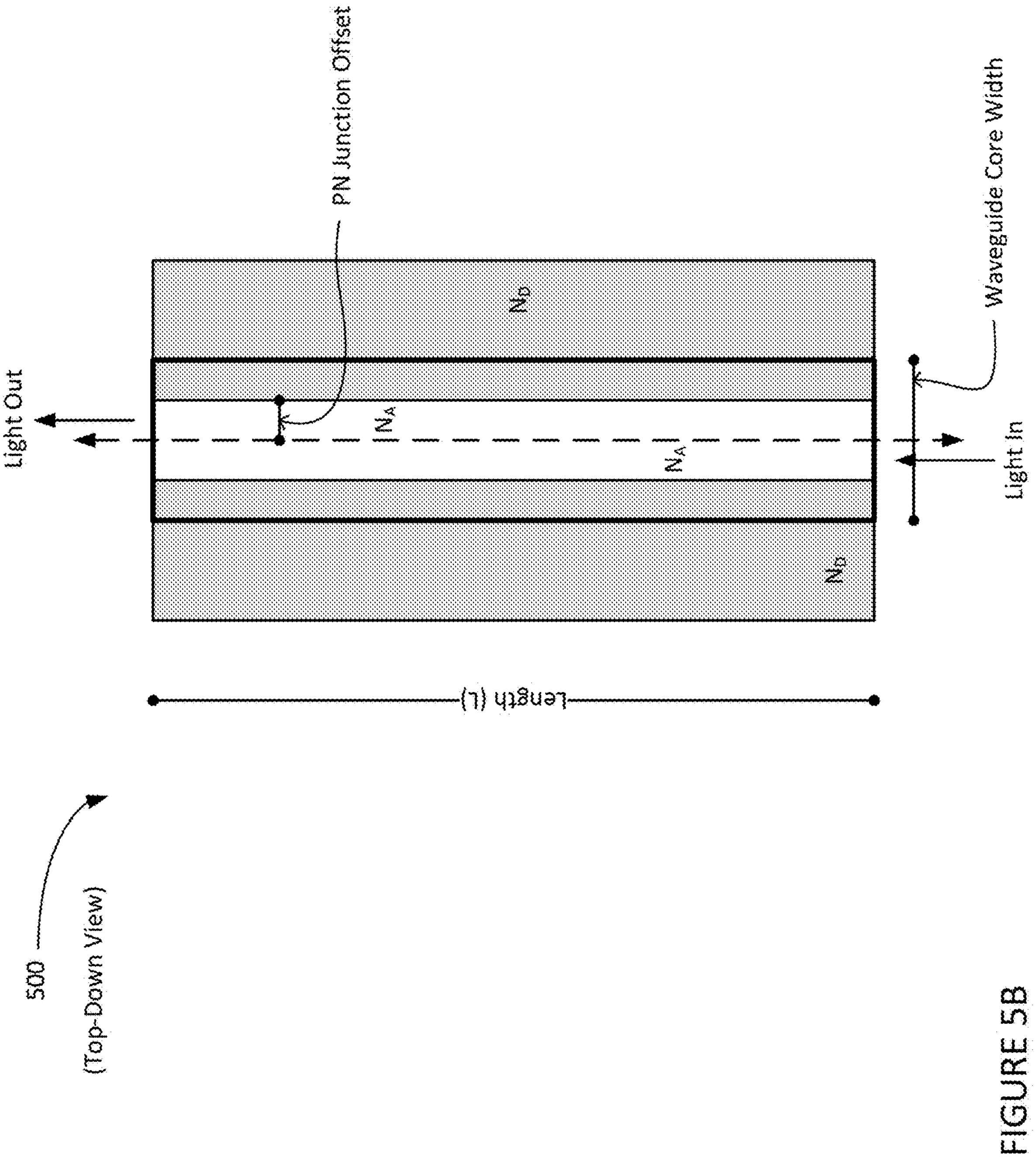
Figure 5C:
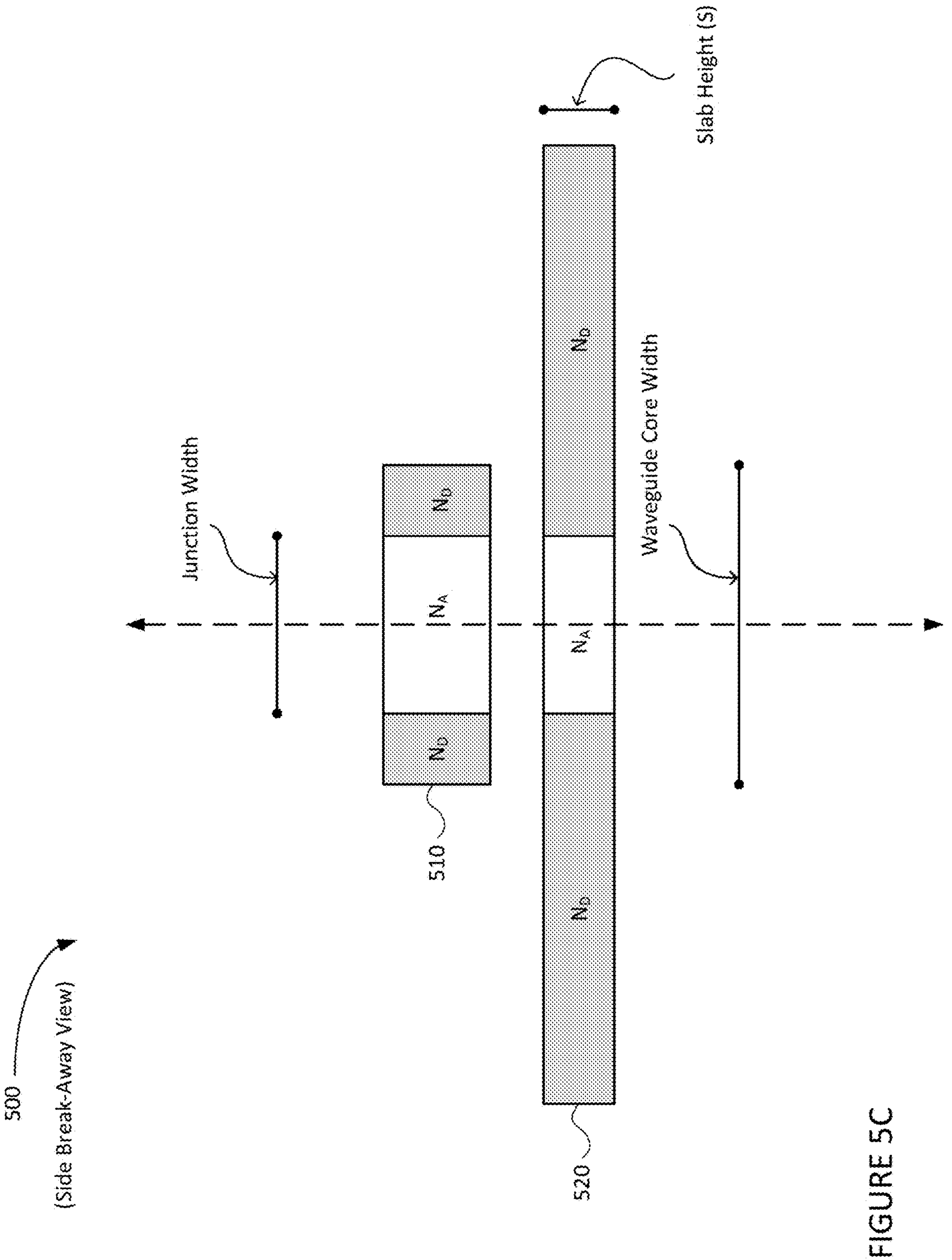

FIGS. 5A, 5B, and 5C are example representative views of the architecture of a very small portion of a phase shifter 500 which may correspond to any of the phase shifters 331-335 of the plurality of phase shifters 330. FIGS. 5A and 5C are cross-sectional views, and FIG. 5B is a top-down perspective view. In this example, the phase shifter may be a pure or all-silicon phase shifter leveraging depletion modulation. As depicted, the phase shifter 500 includes a length dimension L (only a portion of the entire length L of the phase shifter being depicted in FIG. 5B), a core height dimension H, a slab height dimension S, a PN junction distance from waveguide center (PN junction offset) dimension, a junction width or PN junction width, and a waveguide core width dimension (wcore or Wcore or $w_{core}$).

The phase shifter 500 may provide low-power capacitive actuation of the aforementioned OPA architecture, while providing for low optical loss when functioning as a waveguide. For example, phase shifter 500 may include an NPN geometry such as a slab-contacted NPN junction scheme. As shown in FIG. 5C, the slab-contacted NPN junction scheme geometry of the phase shifter 500 includes a rib portion 510 protruding from a slab portion 520 depicted in break-away view between these portions for ease of understanding. Each of the rib portion 510 and slab portion 520 are formed from silicon. Dopants (holes and electrons) are implanted within the slab and the rib forming continuous doped regions $N_a$ (e.g., hole-doped) and $N_d$ (e.g., electron-doped). A such, there may be no need to intersect the rib (which is P-doped or hole doped) to contact a P-channel which uses hole flow as a charge carrier. This may maximize hole overlap under a wide range of doping concentration or densities (not limited by typical multi-project wafer constraints) and full multi-pi (71) phase switching. The phase shifter 500 may require relatively low (e.g., $10^{16}$ $cm^{-3}$, where $cm^{-3}$ corresponds to a unit of $1/cm^{-3}$ to $10^{17}$ $cm^{-3}$) doping densities for optimally low-loss operation for select waveguide geometries, with maximum optical losses expected to be down to 3 dB (decibels) or less. The functional attributes of the phase shifter 500 may be assessed via various FOMs, including lower phase shift-loss and lower or comparable absorption.

In the example phase shifter 500, the $N_a$ regions or concentration portions correspond to hole-doped or P-type material with greater hole density, and the $N_d$ regions or donor concentration portions correspond to electron doped or N-type material with higher electron density. To have most of the mode overlapping with holes, while still being able to deplete and hence actuate, a NPN waveguide configuration can be used. This may also avoid the need to fabricate vertical junctions, which may suffer from more reliability (and hence costly development time) concerns.

At the same time, as the carrier concentration is increased, the junction width modulation (e.g., as voltage is applied, the region where the holes and electrons overlap and cancel out and the junction width changes) of the phase shifter 500 may be reduced when voltage is applied. This may be further compounded by the reduced breakdown voltage experienced by the junction which limits the achievable actuation. This may indicate that there is a dopant concentration that achieves higher phase-shift and lower or comparable absorption, but also that some optical loss could be sacrificed to reduce the phase shifter length dimension for a target phase shift.

While the phase shifter 500 may be configured to enable a 2π phase shift over its full actuation range for typical use cases, the phase shifter 500 may also be configured to enable a 3π phase shift in order to build-in redundancy in the OPA architecture should the full actuation range be compromised by operating conditions.

Figure 6:
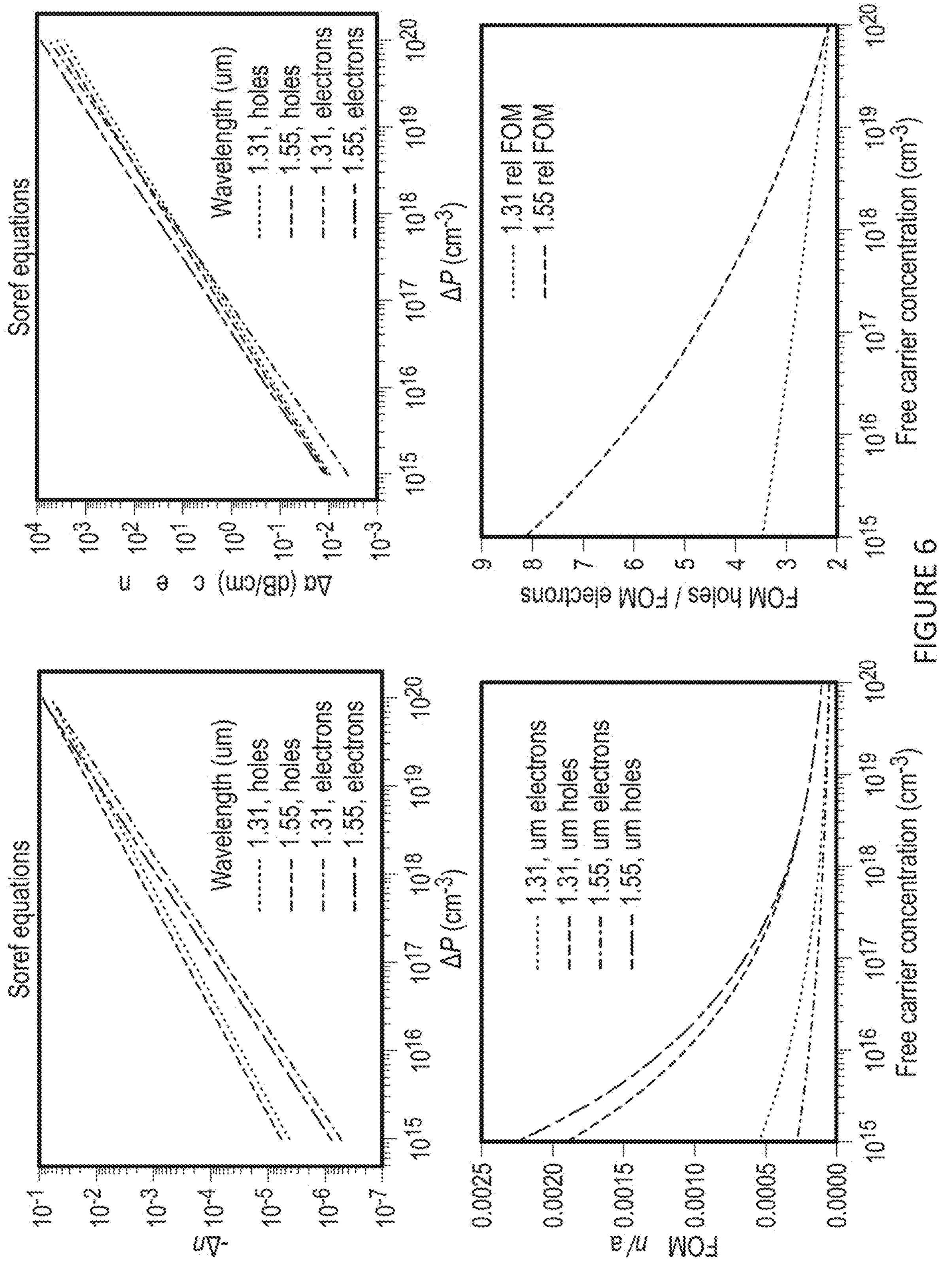
FIG. 6 depicts Soref equations describing free carrier dispersion in accordance with aspects of the disclosure.

In many instances, holes may display manyfold higher figures of merit including higher phase shift and lower or comparable absorption than electrons according to empirical Soref equations shown in FIG. 6 describing free carrier dispersion (both real refractive index and absorption change) in silicon. As can be seen, the phase shifter 500 may use a change in hole concentration to actuate the optical mode. In these examples, $-\Delta n$ may represent the refractive index shit, $\Delta P$ may represent the change in carrier density, $cm^{-3}$ represents $1/cm^{-3}$, and $\Delta\alpha$ may represent the change in absorption coefficient.

However, because actuation requires a depletion region (and hence an adjacent neighboring N-region) these are not typically employed, and so it is easier to use both P and N with the junction located somewhere inside the waveguide in order to reduce the resistive-capacitive (RC) time constant of the phase shifter for faster actuation. Various dopant profiles have been considered to increase the amount of junction experienced by the mode, but these still require overlap with electrons, and, more importantly, are harder to reliably fabricate than lateral junctions.

In addition, while the higher phase shift FOM may seem to increase with reduced dopant concentration, at the same time the absolute phase shift may also be reduced with reduced free carrier concentration. Hence a longer (in length dimension) phase shifter is required, which increases propagation loss, degrading the phase shift. Furthermore, base dopant density in the silicon (PEPI) may not be not well controlled, which may determine a lower bound on reliably achieved low concentration. In this regard, in some applications, the phase shifter length dimension L can have an impact on overall performance of the communications terminal 102, 122, and hence might be tradeable with optical loss.

Figure 7:
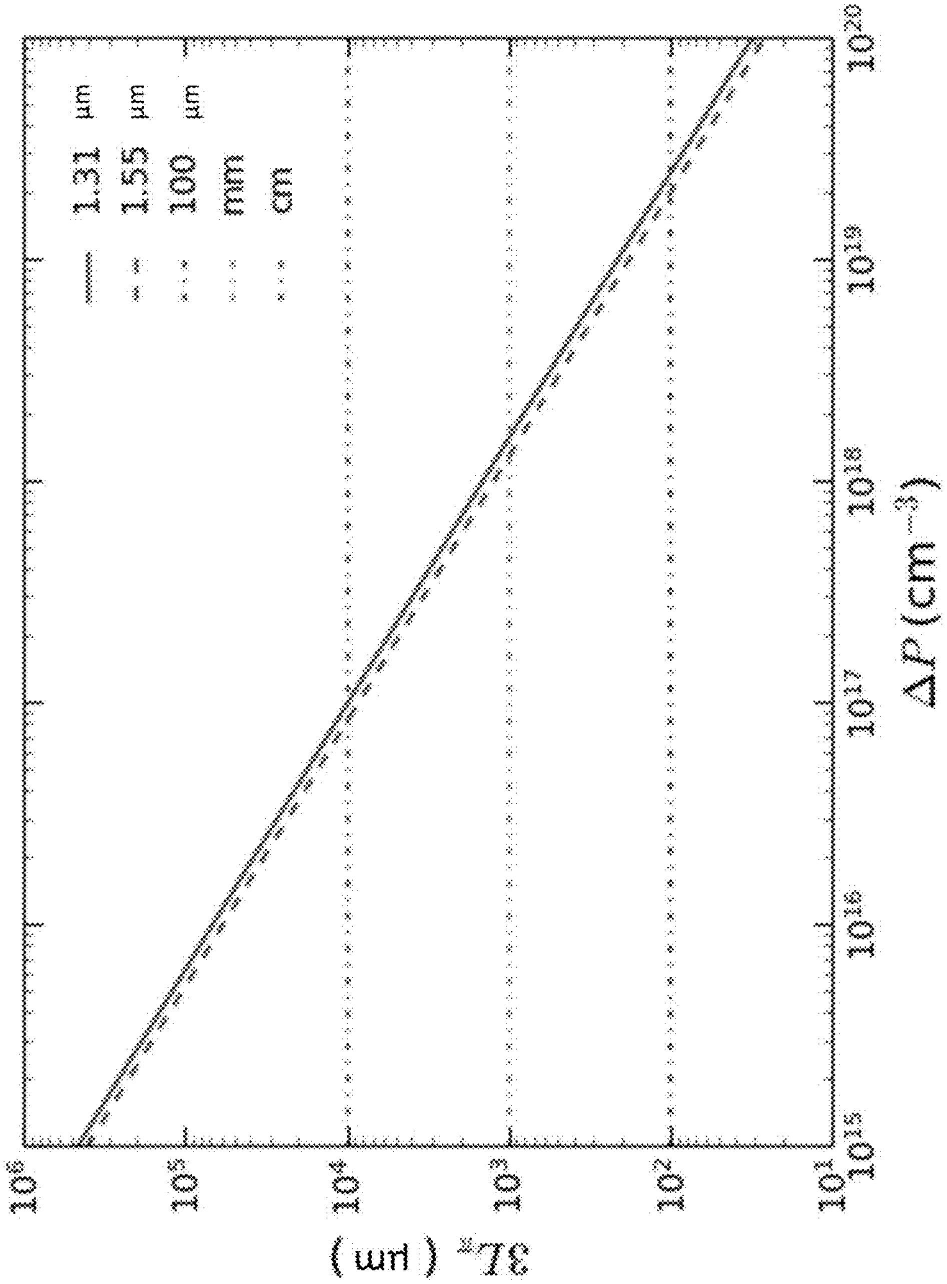
FIG. 7 depicts a plot of estimated length dimensions for a phase shifter in accordance with aspects of the disclosure.

FIG. 7 represents an example plot of estimated length dimension L for the phase shifter 500 represented by a value 3Lpi (3Lπ) in micrometers needed in order to achieve a 3π phase shift as a function of acceptor doping density. This plot was generated using a zero'th order estimate which may represent a theoretical best case achievable with free-carrier modulation. Or rather, going from fully ionized acceptor dopants (maximum hole density) to intrinsic silicon. Going beyond this approximation may still be required for a proper estimate, since overlap between the optical mode and the change in hole density has a strong effect on modulation efficiency and is not captured here. Similarly, at higher doping densities it may not be possible to fully deplete the waveguide before avalanching.

Figure 8:
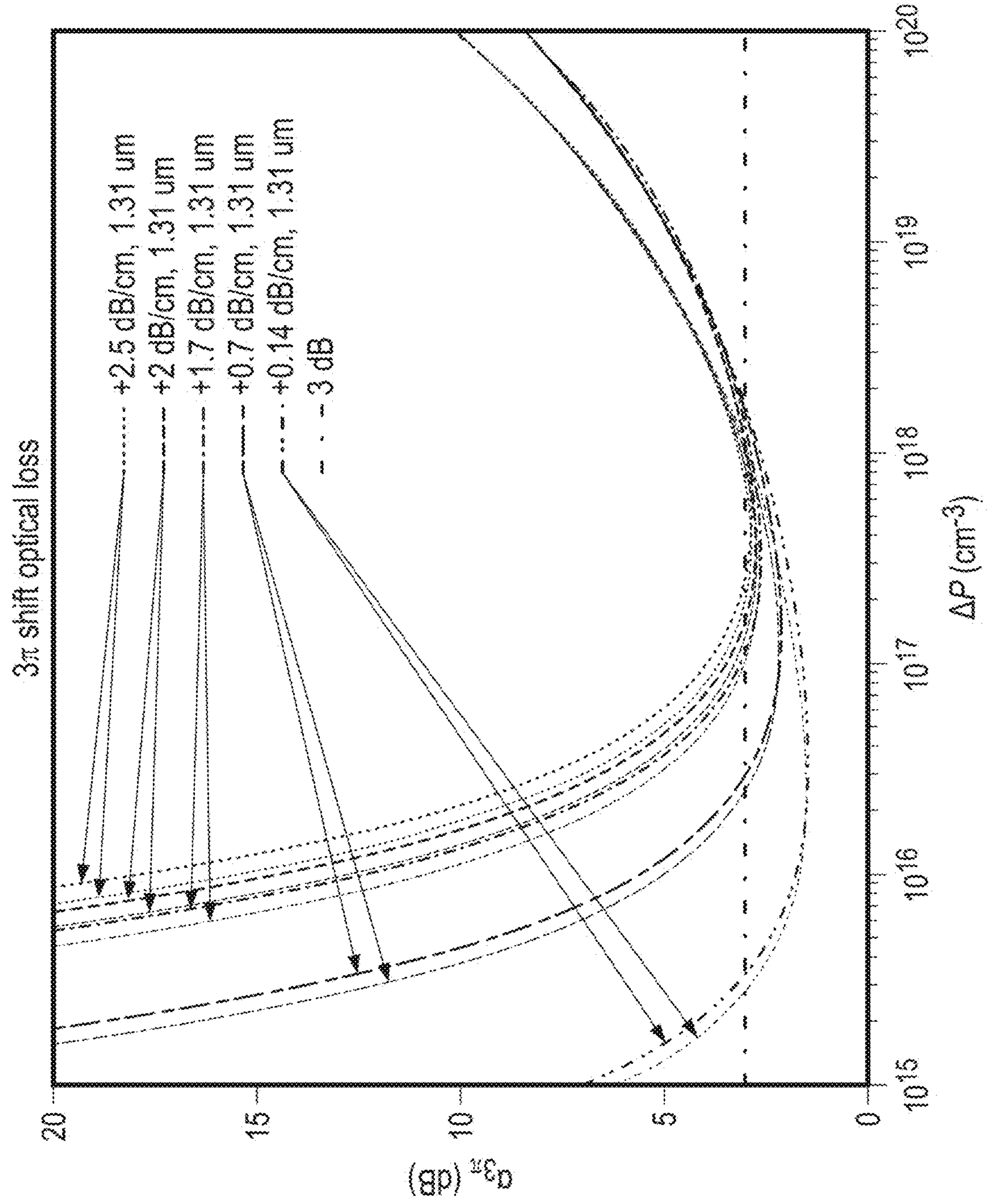
FIG. 8 depicts a plot representing how the length dimension of a phase shifter may lead to a geometry-dependent scattering loss in accordance with aspects of the disclosure.

FIG. 8 provides an example plot representing how the length dimension 3Lpi may lead to a geometry-dependent scattering loss ($\alpha_{3\pi}$). As can be seen, the results are similar for light of wavelengths of 1310 nm (solid-lines) and 1550 nm (dashed lines). The 1.7, 2.0, and 2.5 dB/cm figures may be representative of typical optical communications processes at different waveguide width dimensions, whereas low 0.7 and 0.14 dB/cm have been observed in other, annealed silicon waveguides. In addition, the low $10^{17}$ $cm^{-3}$ range of doping density may be particularly useful, since it may correspond to the absorption minimum for a multitude of conditions for the OPA architecture. Furthermore, in that regime, large reverse bias breakdown voltage may be expected, validating the zero'th order approximation.

Depletion approximation for index perturbation for the phase shifter 500 may also be evaluated. For example, the refractive index of a waveguide geometry may be perturbed according to the Soref equations given the voltage-dependent charge distribution from a depletion approximation. With this approximation, the depletion region ($d_p$+$d_n$) may have no free charge, and the surrounding doped regions may have a free charge equal to dopant concentration of majority carriers and $$n_i^2/N$$

minority carriers (almost negligible effect on index). For example, the depletion region may be determined from the following equation:

$$d_p + d_n = \sqrt{\frac{2\epsilon}{q}\frac{N_A + N_D}{N_A N_D}(\Delta V - V_{bi})}$$

In this example, $d_p$ may be the hole depletion width, $d_n$ may be the electron depletion width, ΔV may be the applied voltage, q may be elementary charge (e.g., a fundamental constant), and ϵ may be the dielectric permittivity of silicon, and $V_{bi}$ may be the junction built-in voltage. The relationship between $d_p$ and $d_n$ may be represented by the equation:

$$d_p N_A = d_n N_d$$

Finally, $V_{bi}$ may be defined by the equation:

$$V_{bi} = \frac{K_B T}{q} \ln \ln \frac{N_A N_D}{n_i^2}$$

In this example, $k_B$ is the Boltzmann constant (e.g., a fundamental constant), T may represent temperature of the phase shifter (in Kelvins), and $n_i$ may represent the intrinsic carrier concentration or the charge concentration in the absence of doping.

Figure 9:
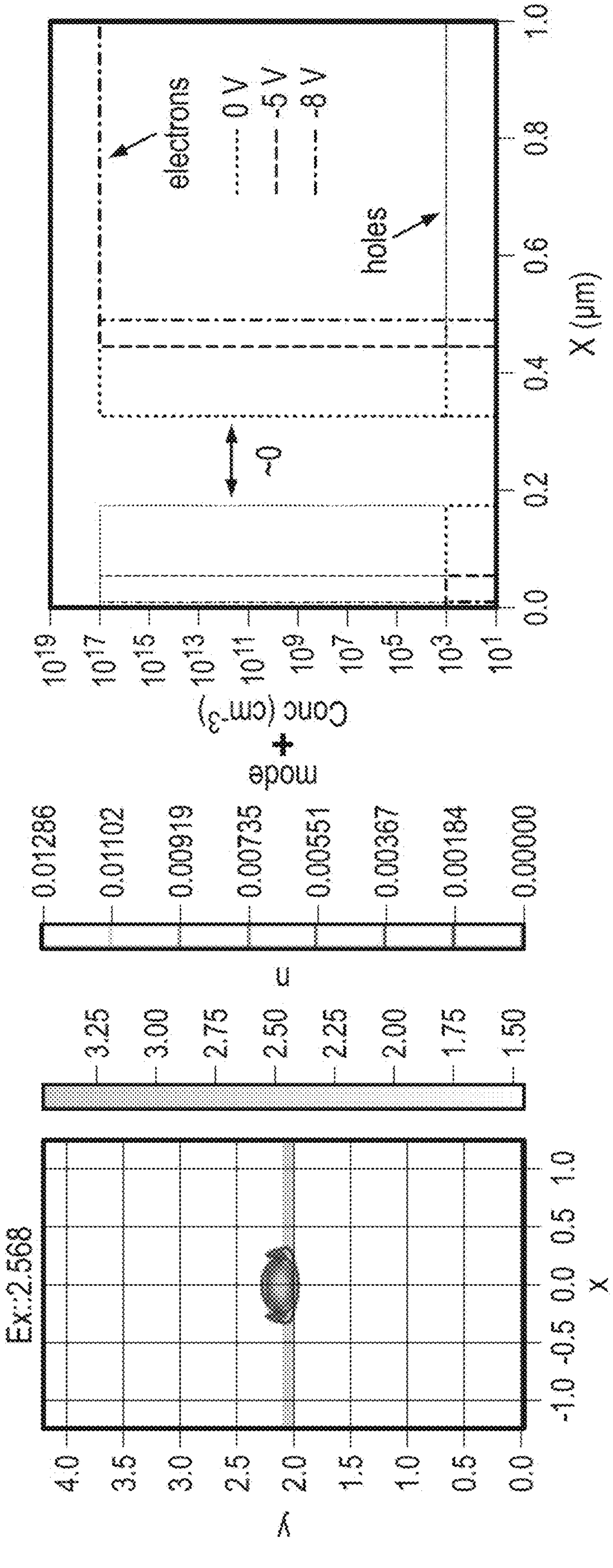
FIG. 9 depicts a model of a distribution of holes and electrons for a given junction position for a phase shifter in accordance with aspects of the disclosure.

If the NPN geometry of the phase shifter 500 is symmetrical (as represented in FIGS. 5A and 5B), the distribution of holes and electrons, where x=0 corresponds to the waveguide center, for a given junction position may be modeled as depicted in FIG. 9. On the left, the waveguide mode profile is represented overlaid with the waveguide cross-section, showing concentration of the light inside the core region. On the right, a model for electron (solid line) and hole (dashed lines) concentrations is presented as a function of position away from the core center for a given junction position. In this approximation, the electron and hole densities equal the donor and acceptor dopant densities, respectively, except in a depletion region about the junction where respectively, each concentration goes to zero. The size of the depletion region depends on the voltage applied. Using the relationship between free charge and refractive index of FIG. 6, the effect of applied voltage on light propagation in the waveguide can be estimated. As depicted, "mode" refers to waveguide modes for the phase shifter 500, and Conc refers to carrier concentration. The estimated depletion widths are validated against an external solver.

Figure 10:
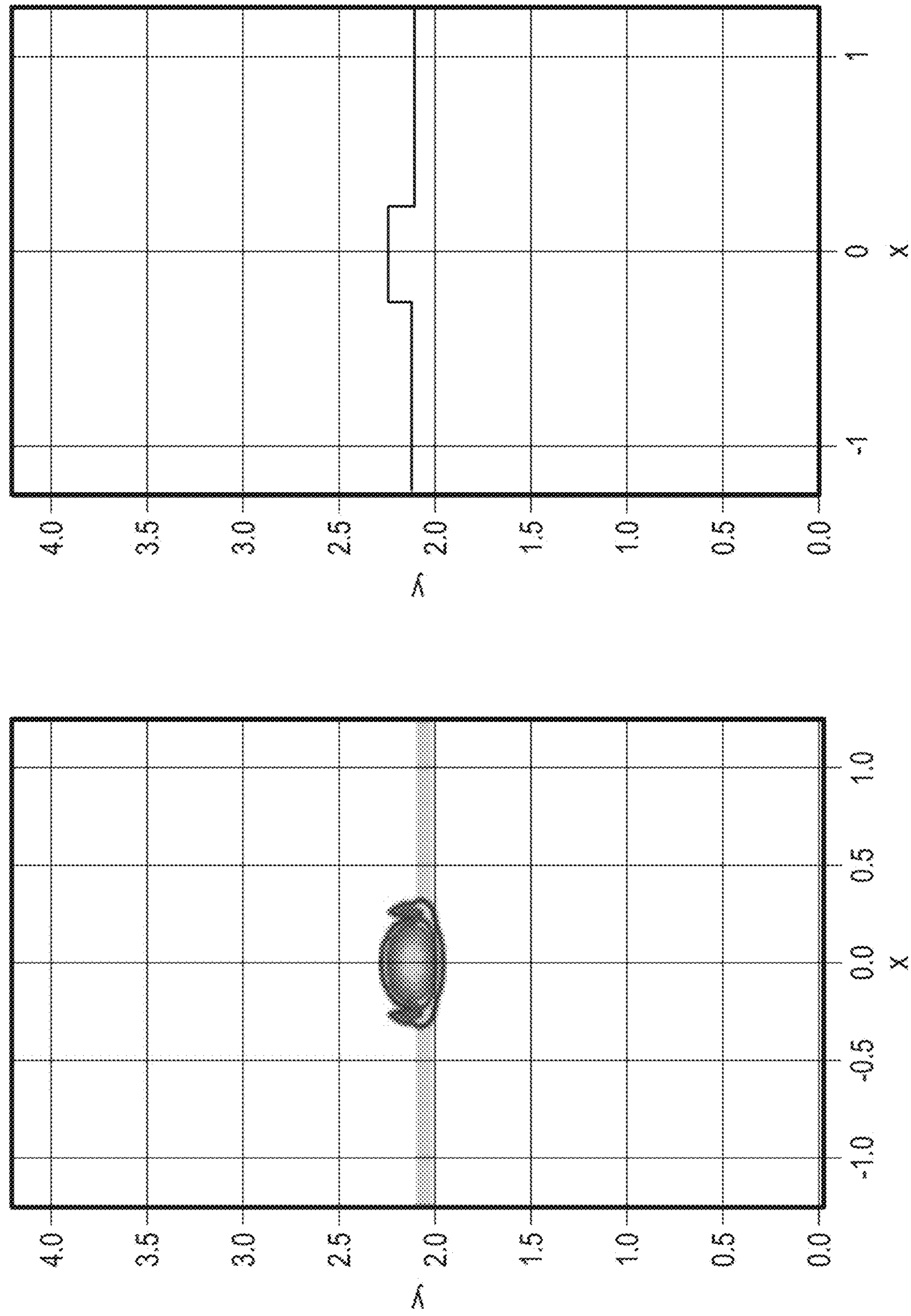
FIG. 10 depicts a plot of extraneous waveguide loss due to scattering with rough surfaces of the waveguide for the phase shifter in accordance with aspects of the disclosure.

Extraneous waveguide loss due to scattering with rough surfaces of the waveguide for the phase shifter 500 may also be modeled. This may be achieved by adding a thin absorbing layer at the waveguide-cladding interface and represented as shown in FIG. 10.

Figure 11:
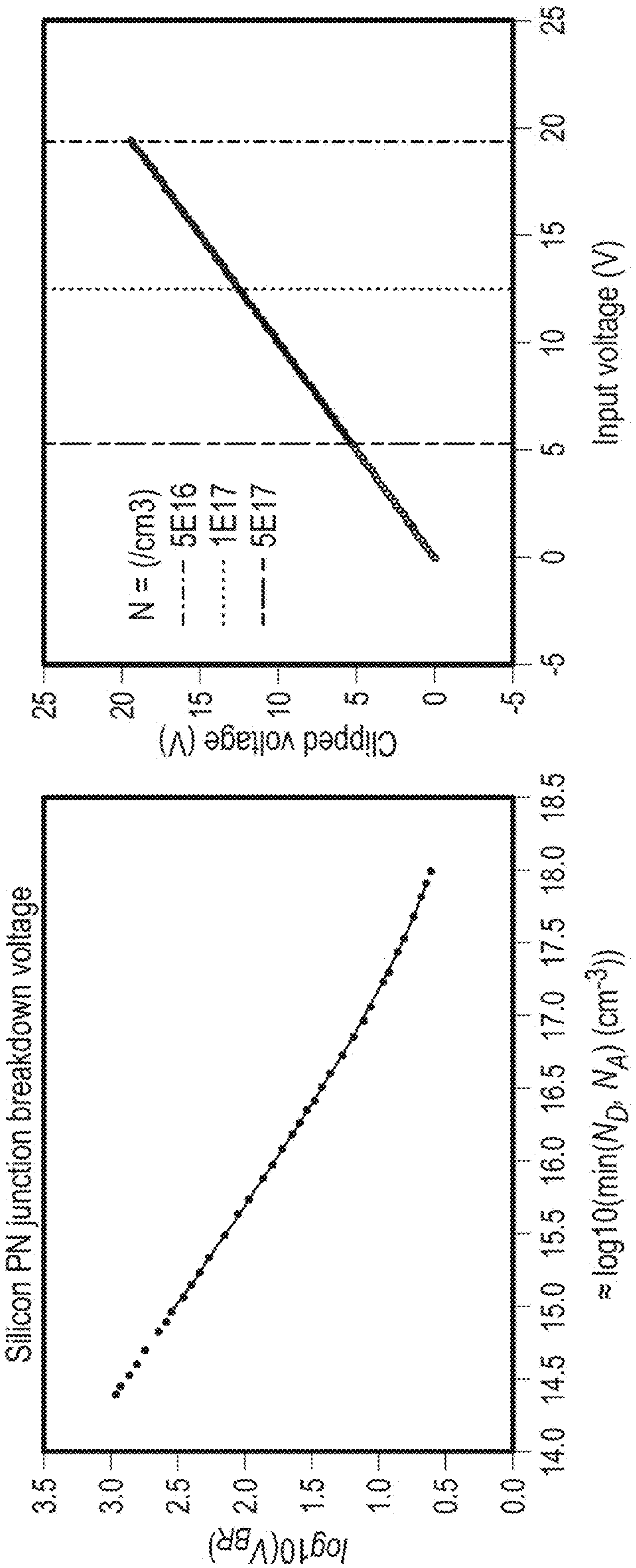
FIG. 11 depicts example approximations of breakdown voltages for different configurations of a phase shifter in accordance with aspects of the disclosure.

FIG. 11 depicts example approximations of breakdown voltages $V_{BR}$ for different configurations of the phase shifter 500. In this example, the voltage range considered is between 0 and 20 volts, inclusive, and results where a given junction would experience breakdown conditions were ignored by including an empirical model for the breakdown voltage of the junction and limiting the maximum voltage swing considered. In this example, Clipped voltage refers to the limit of voltage considered considering junction breakdown.

The exact configuration of the parameters of the phase shifter 500 may fall into various ranges. For example, the acceptor concentration $N_A$ may range from $10^{16}$ to $10^{18}$ $cm^{-3}$, the donor concentration $N_D$ may range from $10^{16}$ to $10^{18}$ $cm^{-3}$ ($10^{16}$ $cm^{-3}$ being chosen as a lower bound, as it is only ~10 times larger than the base wafer doping density), waveguide core width dimension may range from 500 nm to 2 μm, the PN junction offset may range from 100 nm to 2 μm (the 100 nm lower bound may implies a ~200 nm×~200 nm phase shifter array), and as noted above, the applied voltage may range from 0V to 20V corresponding to a full pre-breakdown range of most doping densities considered. All ranges being inclusive.

Figure 12:
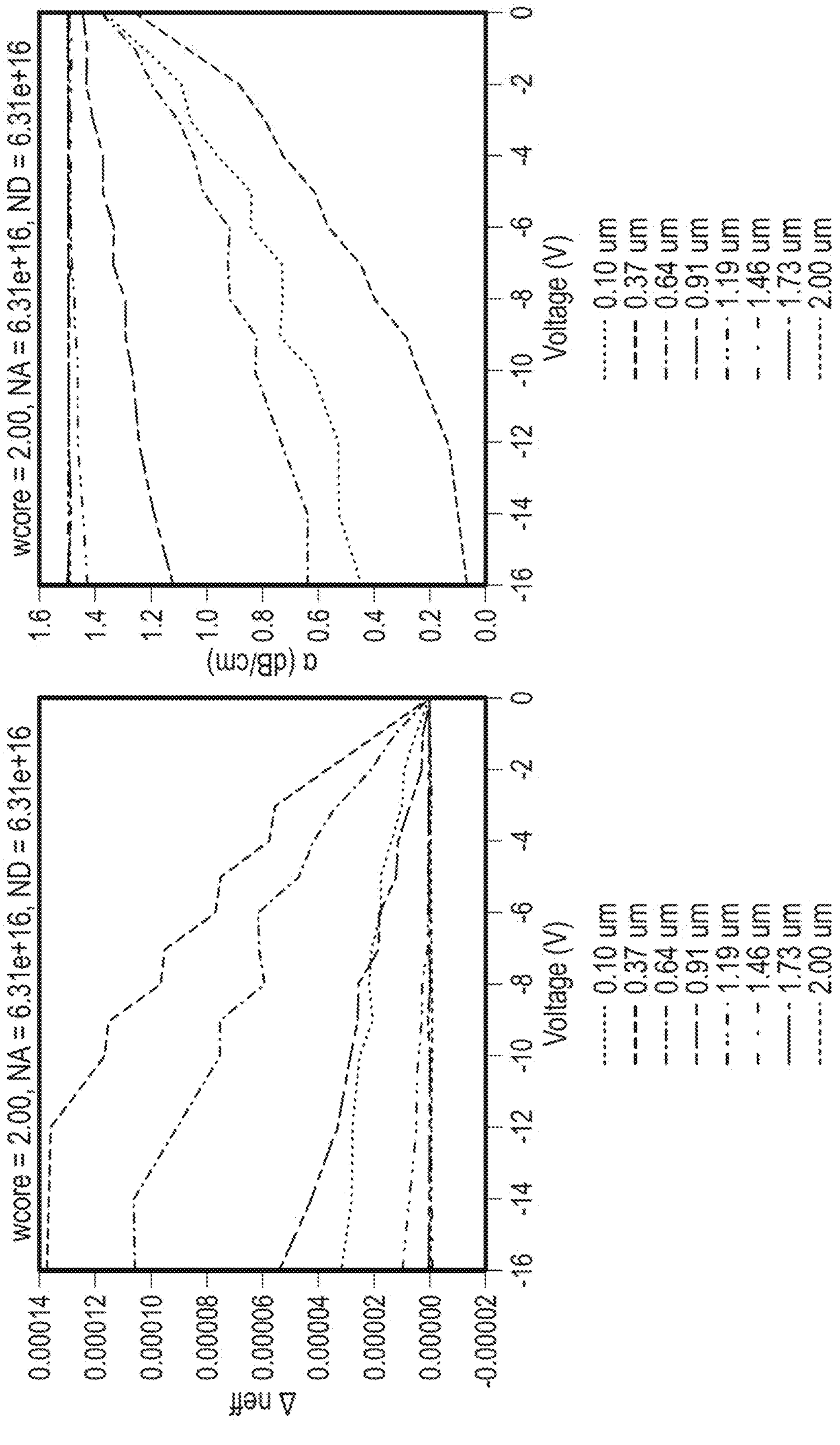
FIG. 12 depicts plots of effective refractive index and absorption coefficient for a plurality of different wavelengths for a phase shifter in accordance with aspects of the disclosure.

FIG. 12 depicts plots of effective refractive index (Δneff) and absorption coefficient (α) for a plurality of different wavelengths for the phase shifter 500 configured with specific set of parameters: waveguide core width dimension=2 μm, $N_A$=6.31×10^16, and $N_D$=6.31×10^16. In this example, the voltage may be clipped (limited) below the sweep range in accordance with predicted breakdown to avoid overestimating the actuation. For many different sets of parameters and voltage ranges, a lack of overlap between carrier change and optical mode (either because the waveguide is fully depleted already or the junction is too far from the waveguide) may result in a flat line, with no change effective refractive index or absorption coefficient. In this regard, the parameters selected for the phase shifter 500 may have a strong effect on the shape of the index change/voltage curve.

The total absorption or loss may be defined according to the following equation:

$$\frac{3\lambda}{2\Delta n_{eff}} \times [\alpha_{carrier} + \alpha_{sidewall}(w_{core})]$$

In this example, λ corresponds to the wavelength of light, the $\Delta n_{eff}$ corresponds to the maximum change in effective index for this configuration (regardless of actuation profile), $\alpha_{carrier}$ corresponds to the maximum or mean loss from the mode calculation, and $\alpha_{sidewall}$ corresponds to the geometry-dependent scattering loss ($\alpha_{3\pi}$) depicted in FIG. 8 and described above.

Figure 13:
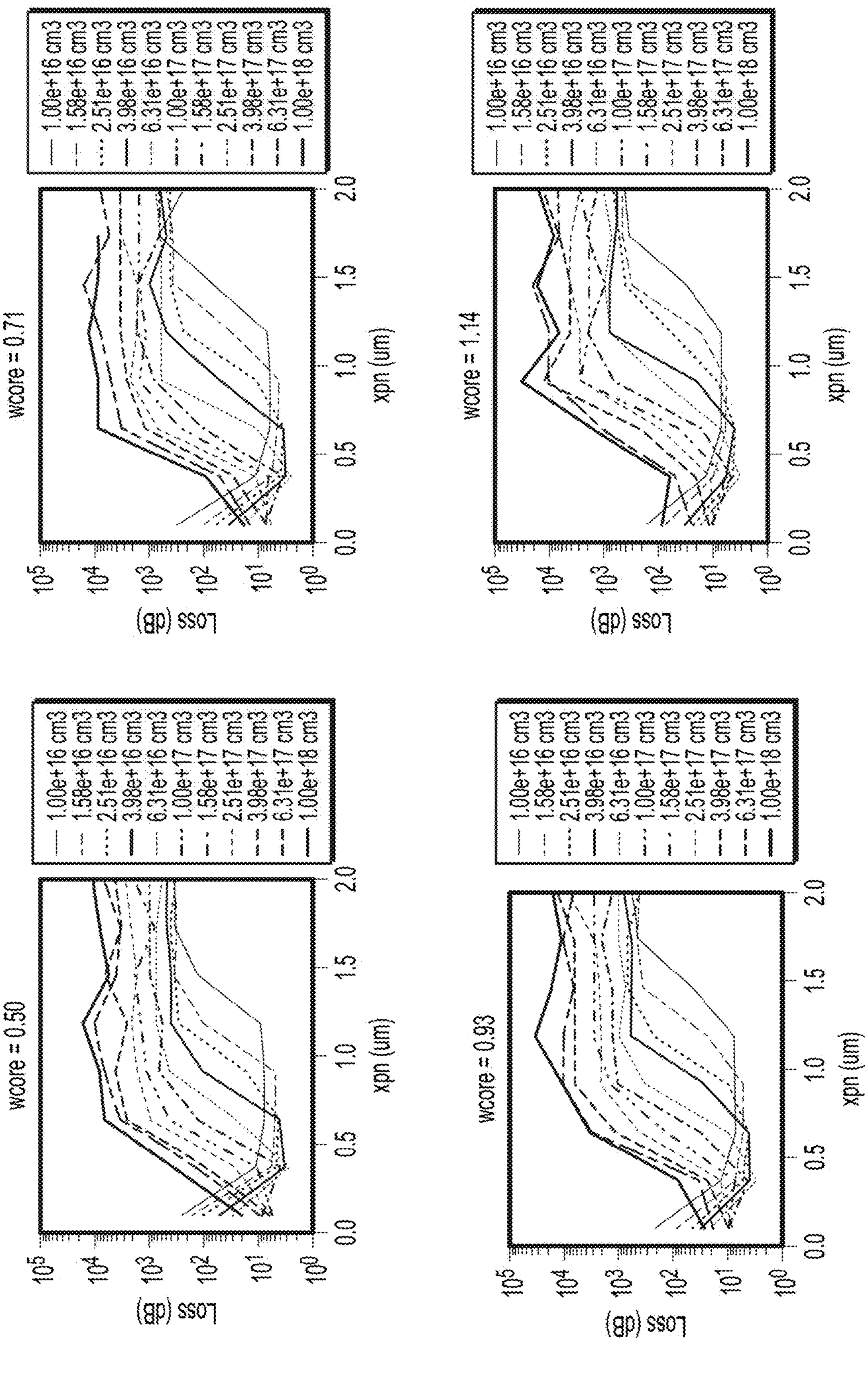
FIG. 13 depicts plots of carrier absorption loss for different waveguide core width dimensions in accordance with aspects of the disclosure.
Figure 13:
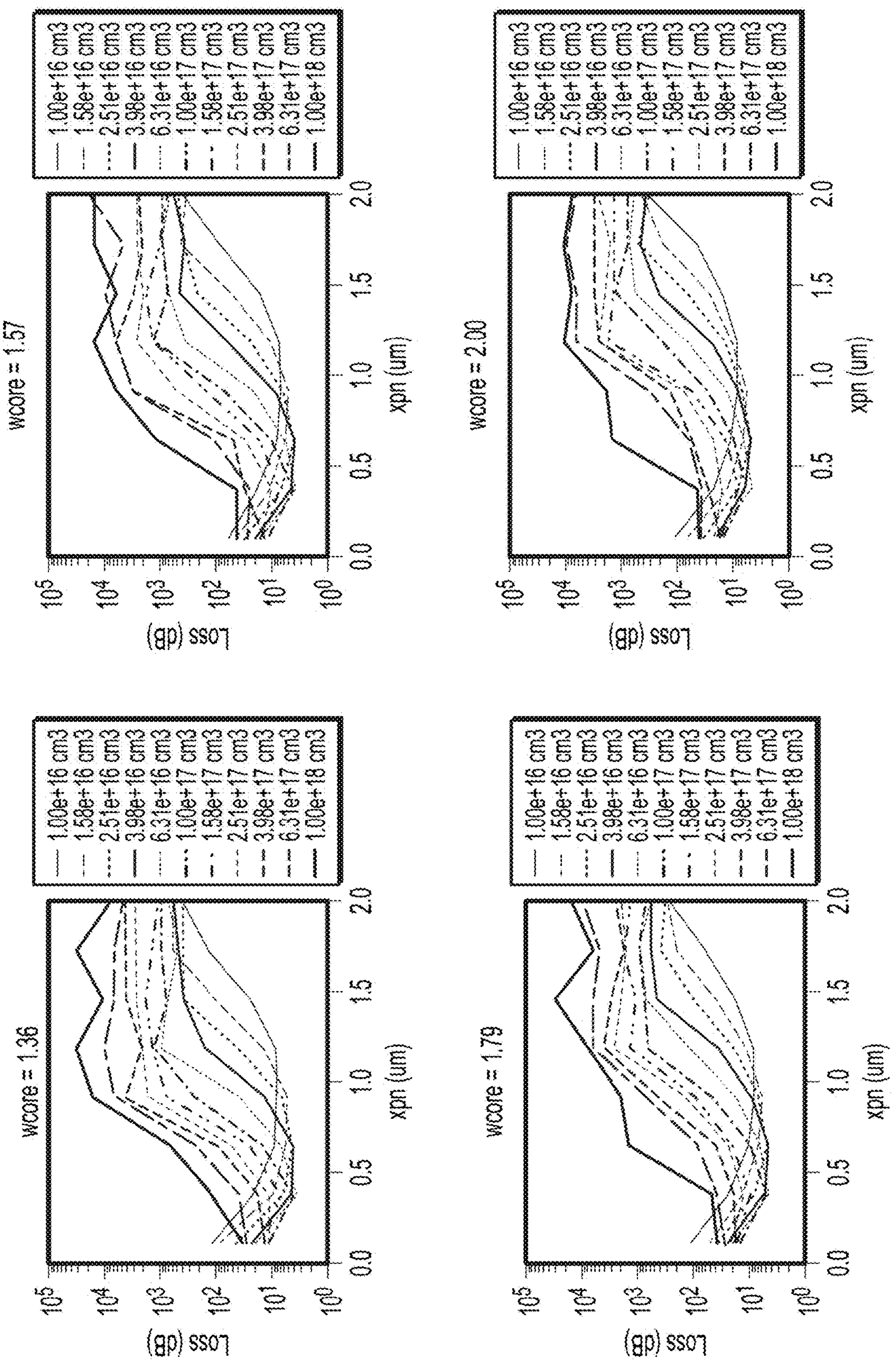

The loss may then be plotted for different waveguide core width dimensions, here range from 500 nm to 2 μm, inclusive, as depicted in FIG. 13. Note that the doping densities are in cm-3. In these plots, the "worst-case" carrier absorption loss over the voltage range is used. In addition, the lines represent different values of symmetric doping densities (identified within the plots), and the x-axis represents different PN junction offsets, here ranging from 100 nm (0.1 μm) to 2 μm, inclusive.

As can be seen, for very low doping densities (less than $10^{17}$ $cm^{-3}$), it is possible to get lower losses for larger PN junction offsets. There is also a critical position below which the loss increases, since full pinch-off of the NPN channel occurs, limiting the maximum phase shift of the phase shifter. Conversely, for very high doping densities, (greater than $10^{17}$ $cm^{-3}$), a larger PN junction offset results in higher losses due to weak overlap between the depletion region and the optical mode over the entire voltage range. Lower losses are observed for smaller PN junction offsets, but generally with higher net loss than middling doping densities (closer to $10^{17}$ $cm^{-3}$). Generally, for PN junction offsets below 500 nm, the range between $5\times10^{16}$ and $10^{17}$ cm-3, yields the lowest loss, thereby validating the zero'th order estimate utilized above with respect to FIG. 7. As the wavelength core width dimension becomes larger than 1.5 μm, higher overall losses are obtained, presumably due to incomplete depletion of the waveguide core which may result in longer required length dimension for the phase shifter 500 (and hence higher propagation loss). In addition, the lowest loss possible that occurs at all configurations appears to be approximately 3 dB.

Figure 14:
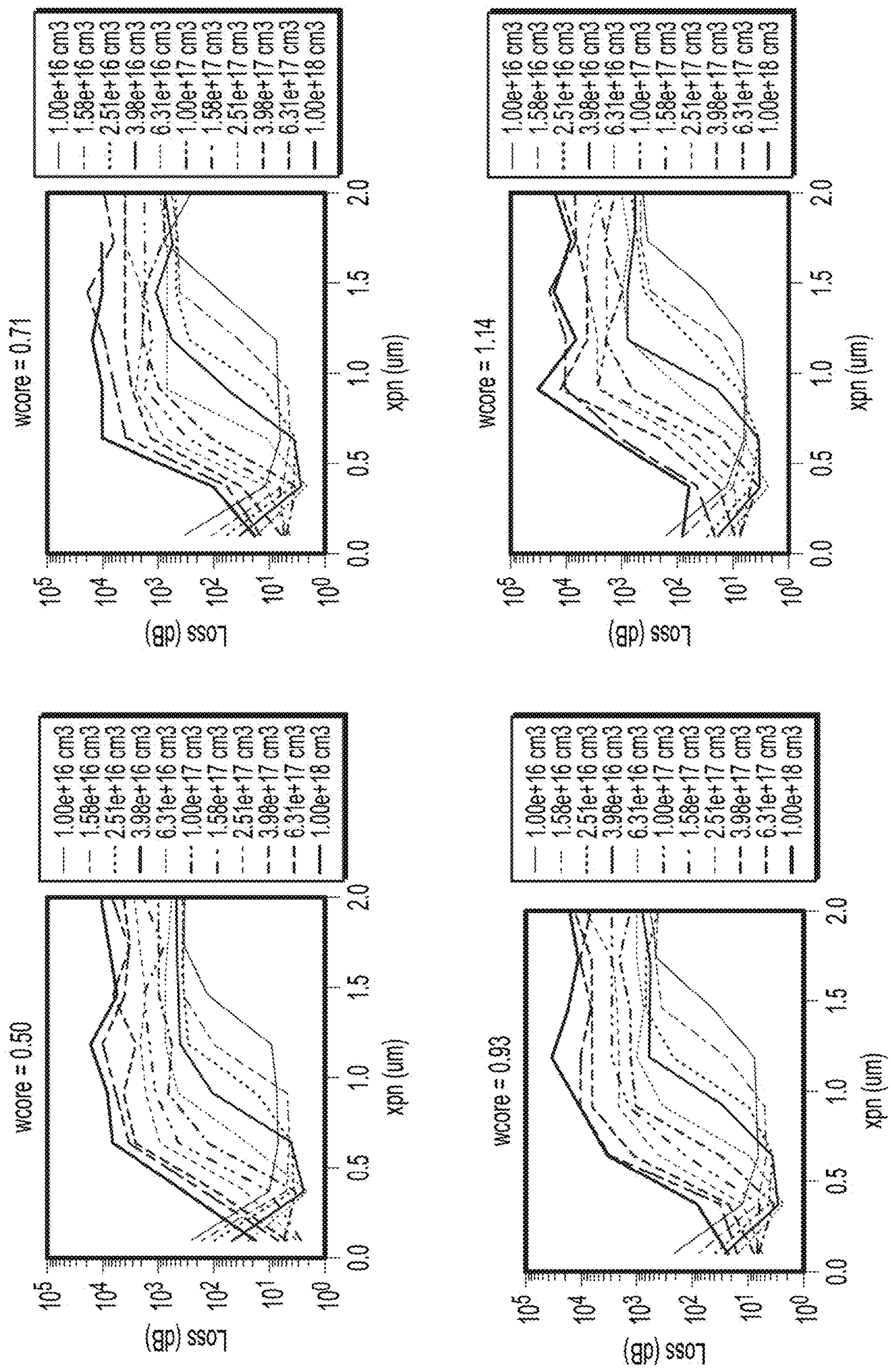
FIG. 14 depicts additional plots of carrier absorption loss for different waveguide core width dimensions in accordance with aspects of the disclosure.
Figure 14:
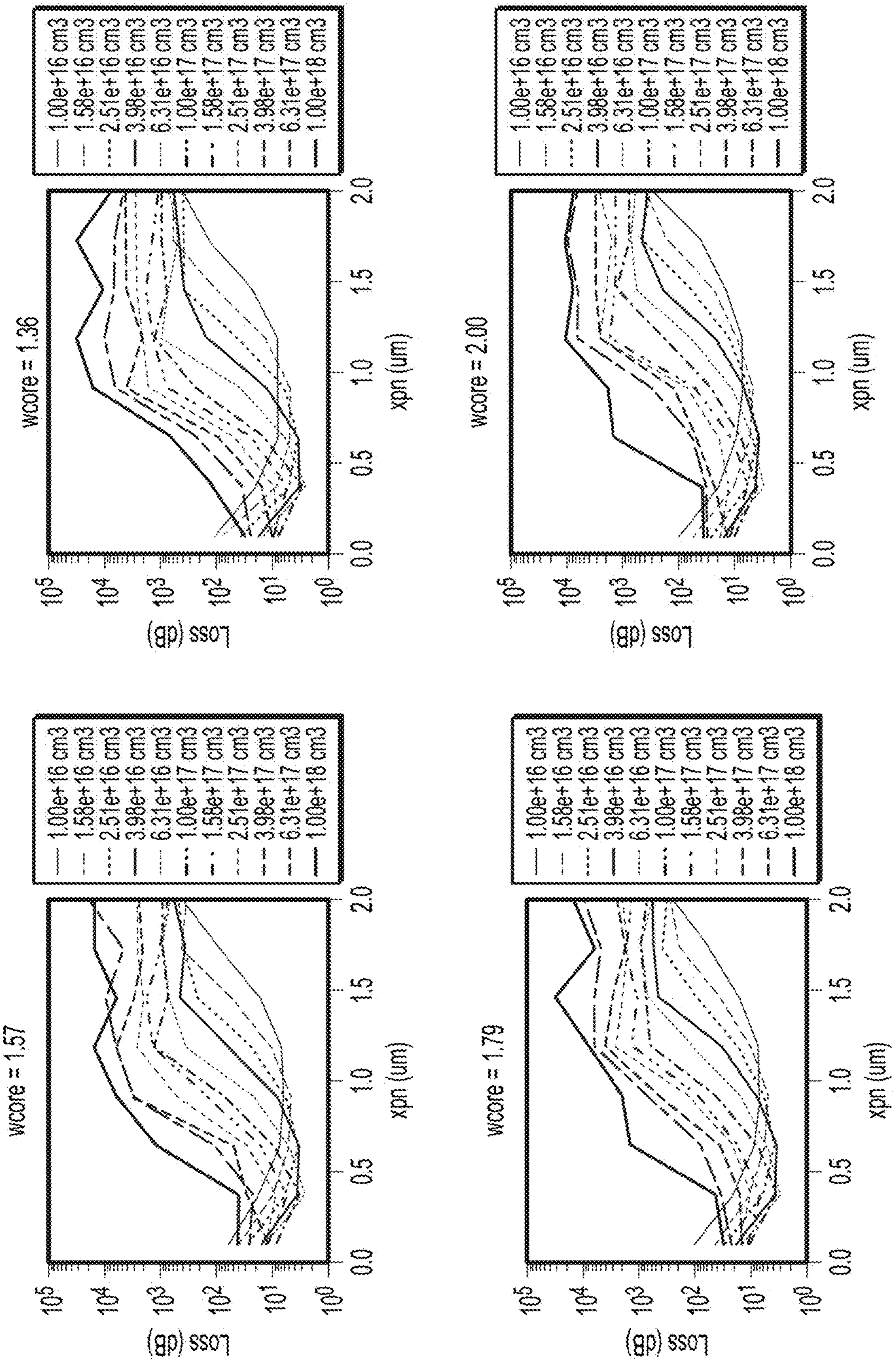

FIG. 14 depicts additional plots of carrier absorption loss for different waveguide core width dimensions, here range from 500 nm to 2 μm, inclusive. Note that the doping densities are in cm-3. In these plots, the "average" carrier absorption loss over the voltage range is used. As with FIG. 13, the lines represent different values of symmetric doping (identified within the plots), and the x-axis represents different PN junction offsets, here ranging from 100 nm (0.1 μm) to 2 μm. Comparing the plots of FIG. 14 to the plots of FIG. 13, the same general trends described above remain. However, in these examples, the average lowest loss possible occurs at all configurations appears to be approximately 2 dB.

Asymmetric P-N doping could allow for more highly doped silicon to be depleted more since breakdown voltage is determined by the lower doping density. However, because the depletion region is shifted towards the low doping density region, asymmetric doping may not result in significant advantages in terms of loss FOM.

Figure 15:
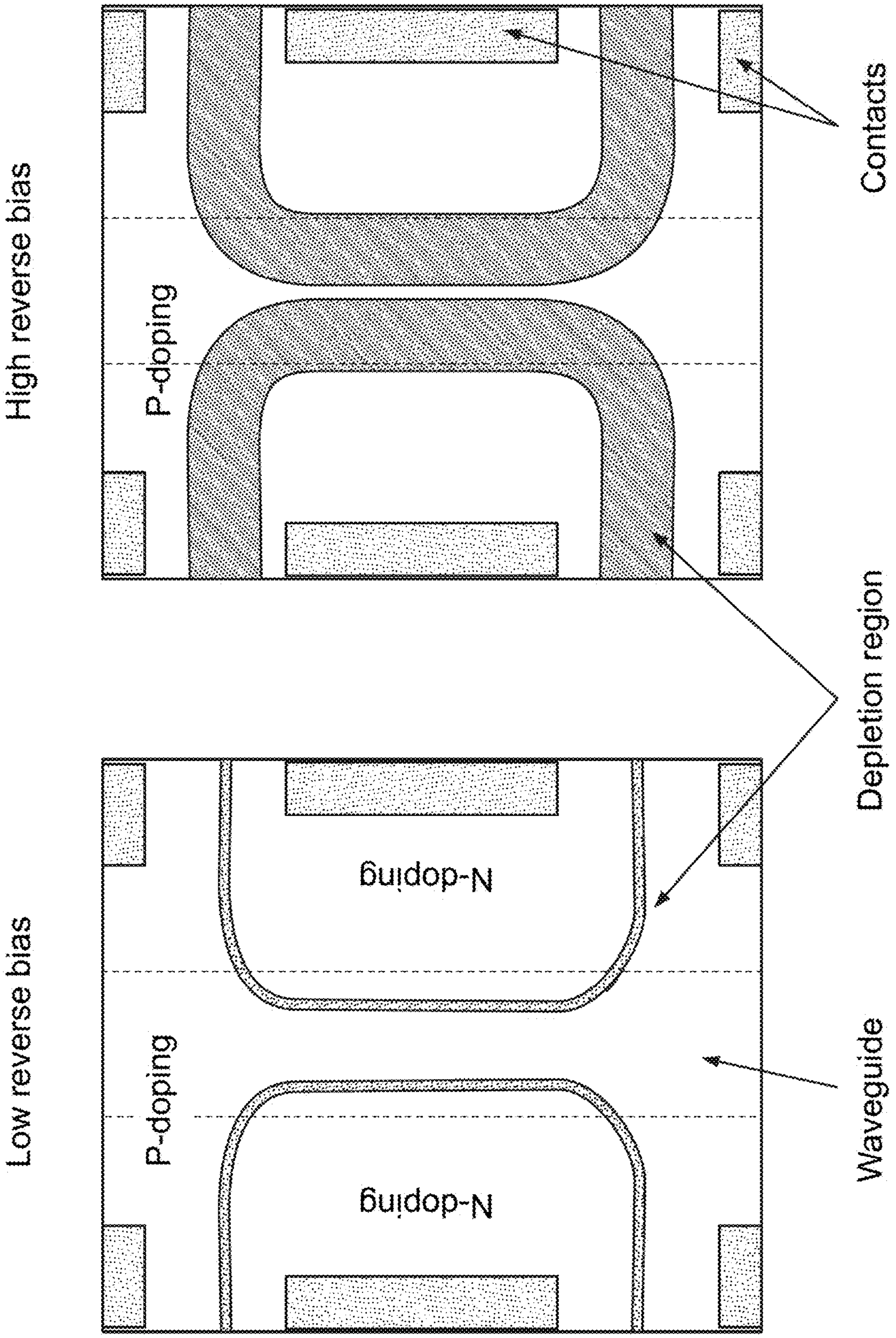
FIG. 15 provides two-dimensional (2D) simulations or models to demonstrate the waveguide depletion for low reverse bias and high reverse bias in accordance with aspects of the disclosure.
Figure 16:
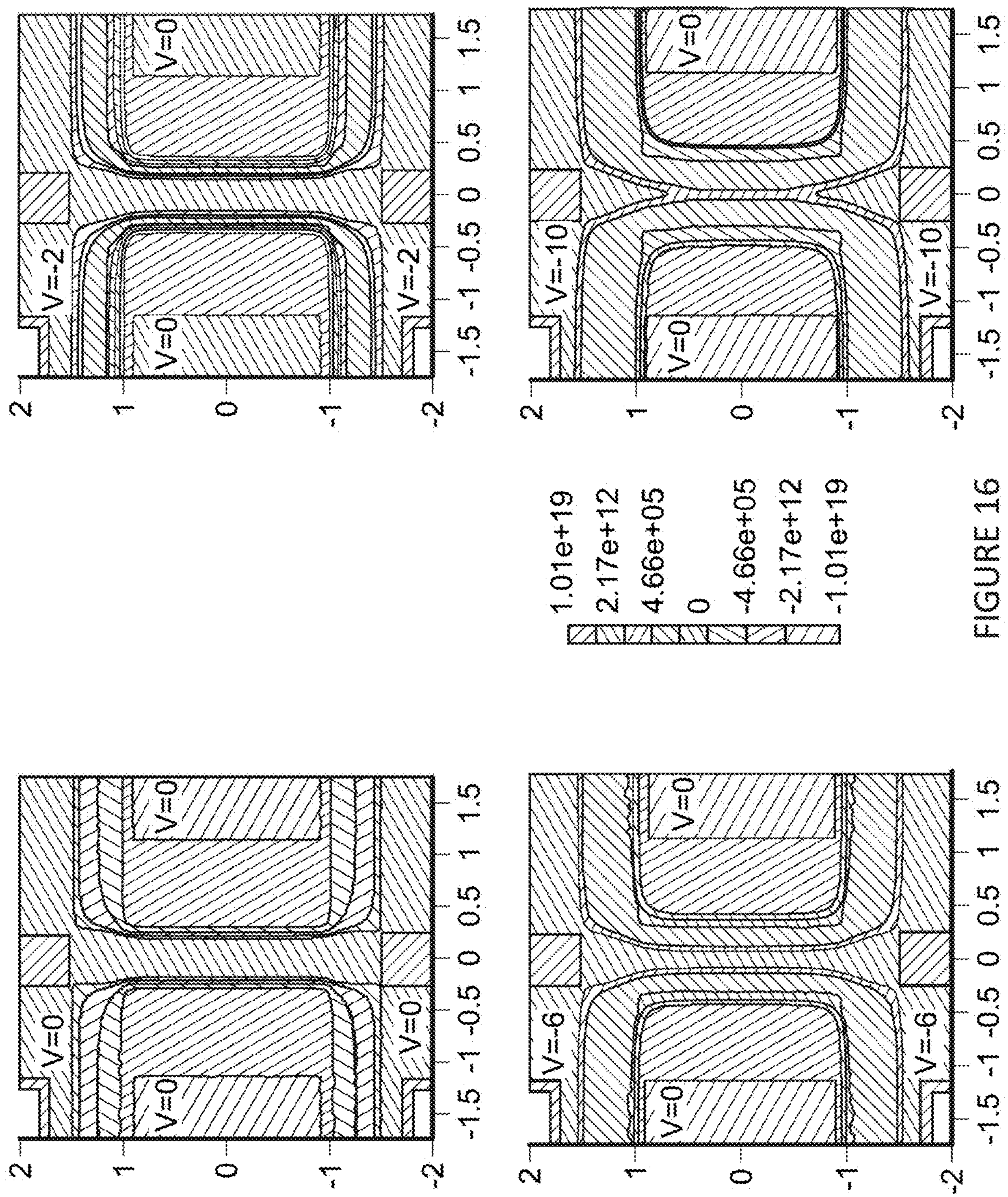
FIG. 16 provides a 2D drift-diffusion simulation for a phase shifter in accordance with aspects of the disclosure.

FIG. 15 provides two-dimensional (2D) simulations or models to demonstrate the waveguide depletion for low reverse bias and high reverse bias. FIG. 16 provides a 2D drift-diffusion simulation to solve for the steady-state charge distribution as a function of source-drain voltage (here 0, −2, −6 and −10 volts). In this example, $10^{17}$ $cm^{-3}$ doping density and a 250 nm PN junction offset were utilized. The 2D simulations confirm that the charge density change as a function of voltage roughly corresponds to the depletion approximation (e.g. generally uniform). In some regions, for example, near "contact rails", which are the strips of p-doped silicon crossing the waveguide that electrically contact the p-region in the waveguide core, a lower-than-expected change is present, which may degrade FOM.

Figure 17:
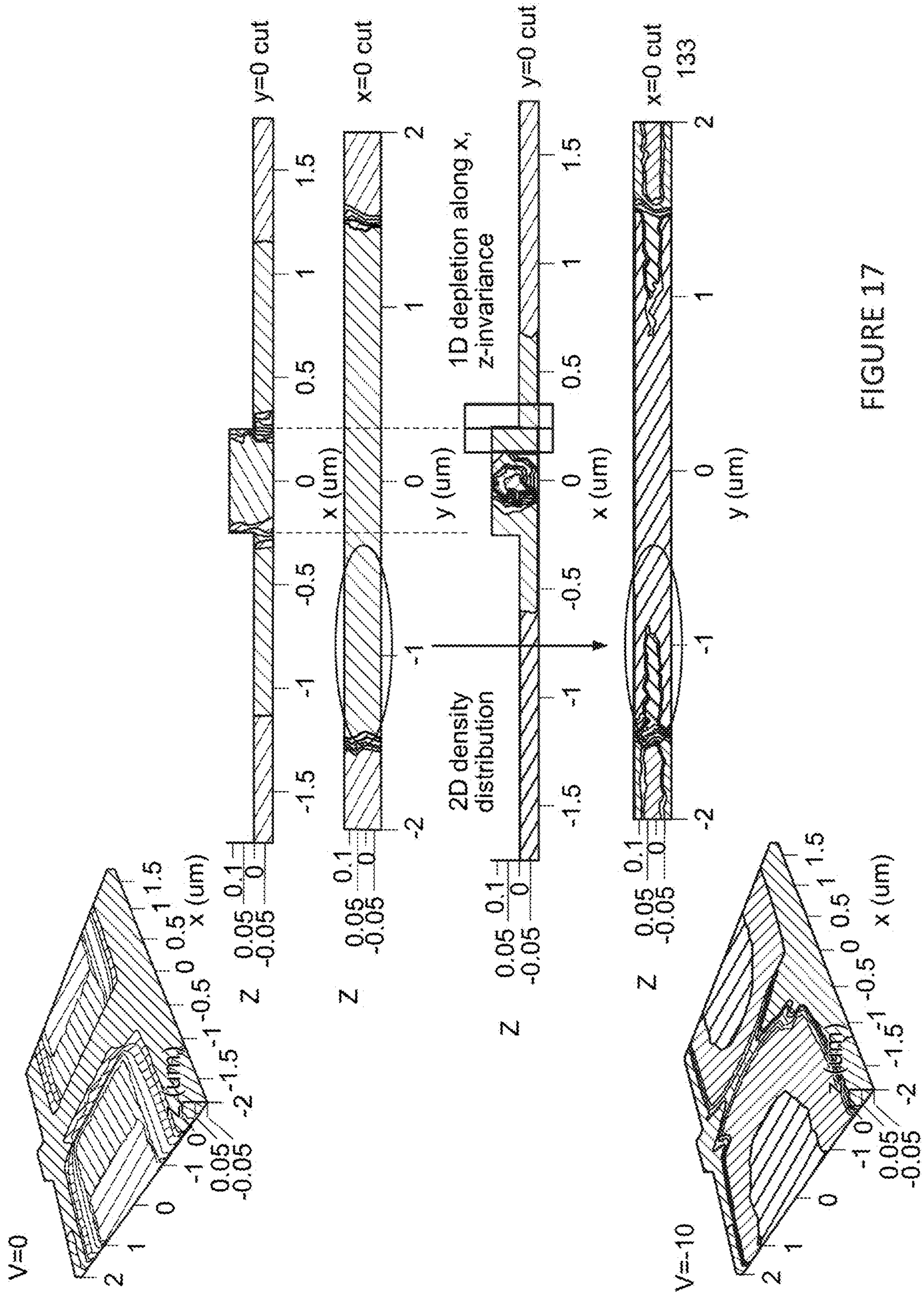
FIG. 17 depicts 3-dimensional (3D) simulations of waveguide depletion for a phase shifter in accordance with aspects of the disclosure.

FIG. 17 provides three-dimensional (3D) simulations or models to demonstrate the waveguide depletion at different source-drain voltages (here 0 and −10 volts). As with the 2D simulations, the 3D simulations confirm that the charge density change as a function of voltage roughly corresponds to the depletion approximation (e.g. generally uniform). The slab-contacted NPN junction scheme of the phase shifter 500 (e.g., the geometry of the rib portion and slab portion) is apparent in the 3D visualization which demonstrates that the charge density can be properly modulated through the rib portion via the contacts of the slab portion. In addition, a small diffusion region near the "contact rails" can also be observed.

The capacitance $C_j$ of the phase shifter 500 may be calculated for a given doping density and waveguide geometry using the equation:

$$C_j = \sqrt{\frac{q\epsilon_r}{2(\Delta V - V_{bi})}\frac{N_A N_D}{N_A + N_D}}$$

Figure 18:
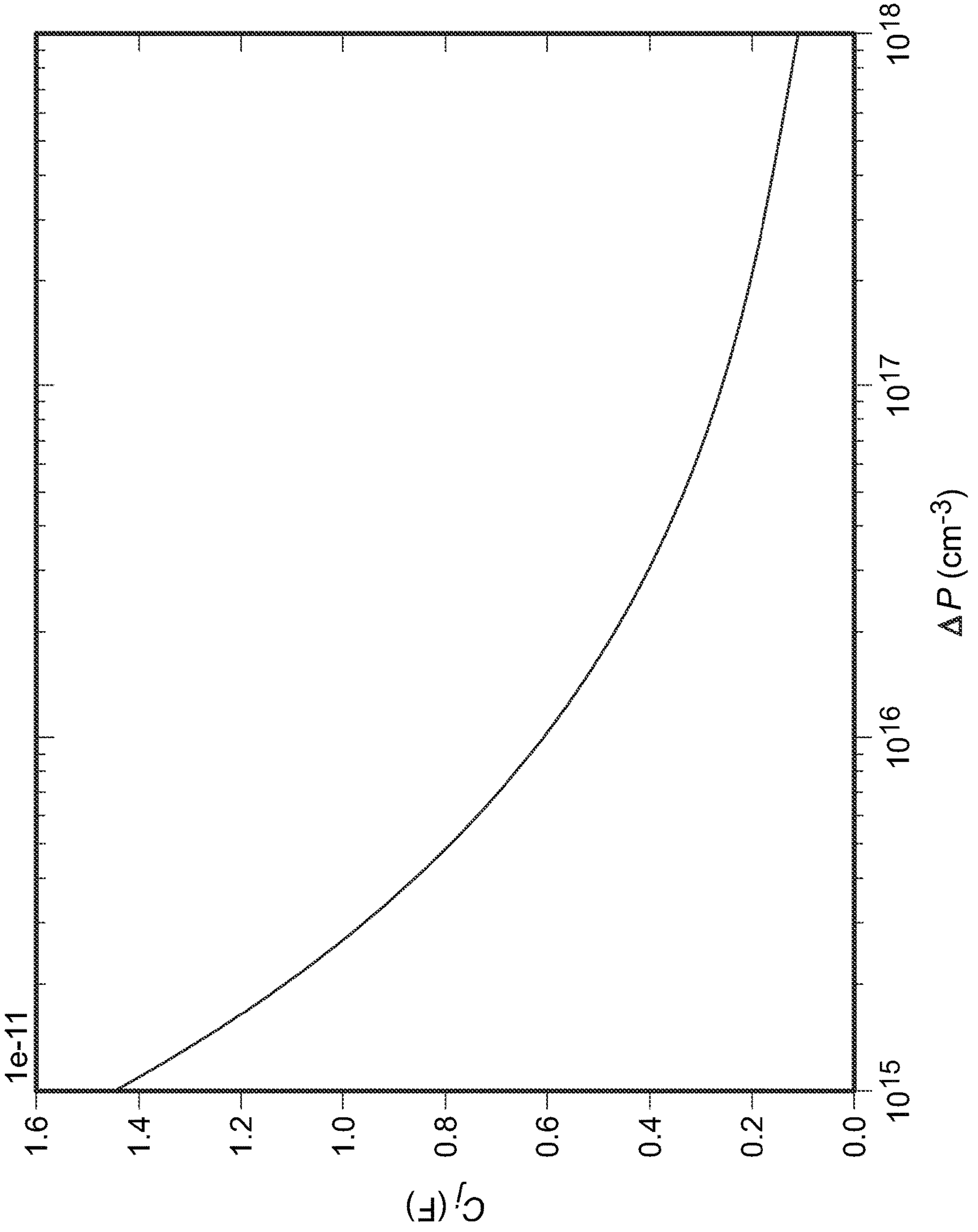
FIG. 18 depicts a plot of total capacitance of a phase shifter in accordance with aspects of the disclosure.

Here, $\epsilon_r$ may be the dielectric permittivity of silicon (same as ϵ above). The highest or worst-case capacitance may be obtained for both doping types; high density of electrons and high density of holes (both NA and ND). The total capacitance of the phase shifter 500 configured with a height dimension H of approximately 220 nm in and a length dimension L of $3L_\pi$ (in the zero'th order approximation) may be on the order of a picofarad (pF) across the considered doping density range as depicted in FIG. 18.

The dynamic switching energy or power $P_{dyn}$ of the phase shifter 500 may be estimated using the equation:

$$P_{dyn}=V^2 C \cdot f$$

Figure 19:
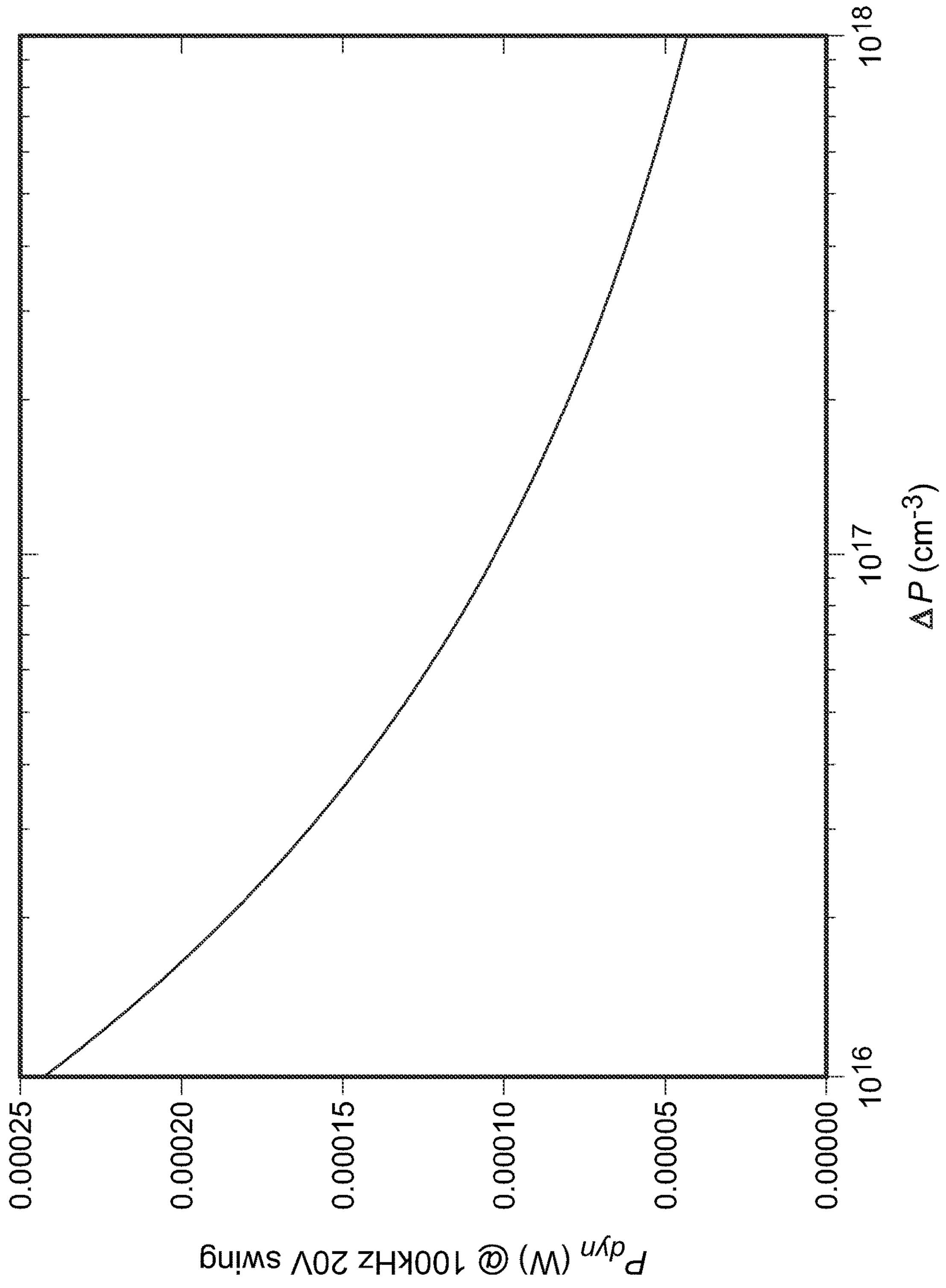
FIG. 19 depicts a plot of dynamic switching energy for a phase shifter in accordance with aspects of the disclosure.

In this example, V is the voltage range, C corresponds to $C_j$ above, and f is a target bandwidth. The worst-case energy consumption of the phase shifter 500 may result when the phase shifter is fully switched every cycle. FIG. 19 depicts this dynamic switching energy in Watts (W) for a target bandwidth of f~100 kHz and a voltage range of 0 to 20 volts, inclusive or a "20 volt swing" for the configuration of the phase shifter 500 of FIG. 18. As can be seen, the power consumption of the phase shifter 500 is well under 0.1 mWatt. Given that typical swings over the clock cycle will be much less than full range (for example, for 10% of the voltage range or 2V), the expected power use of the phase shifter 500 may be on the μWatt level.

Figure 20:
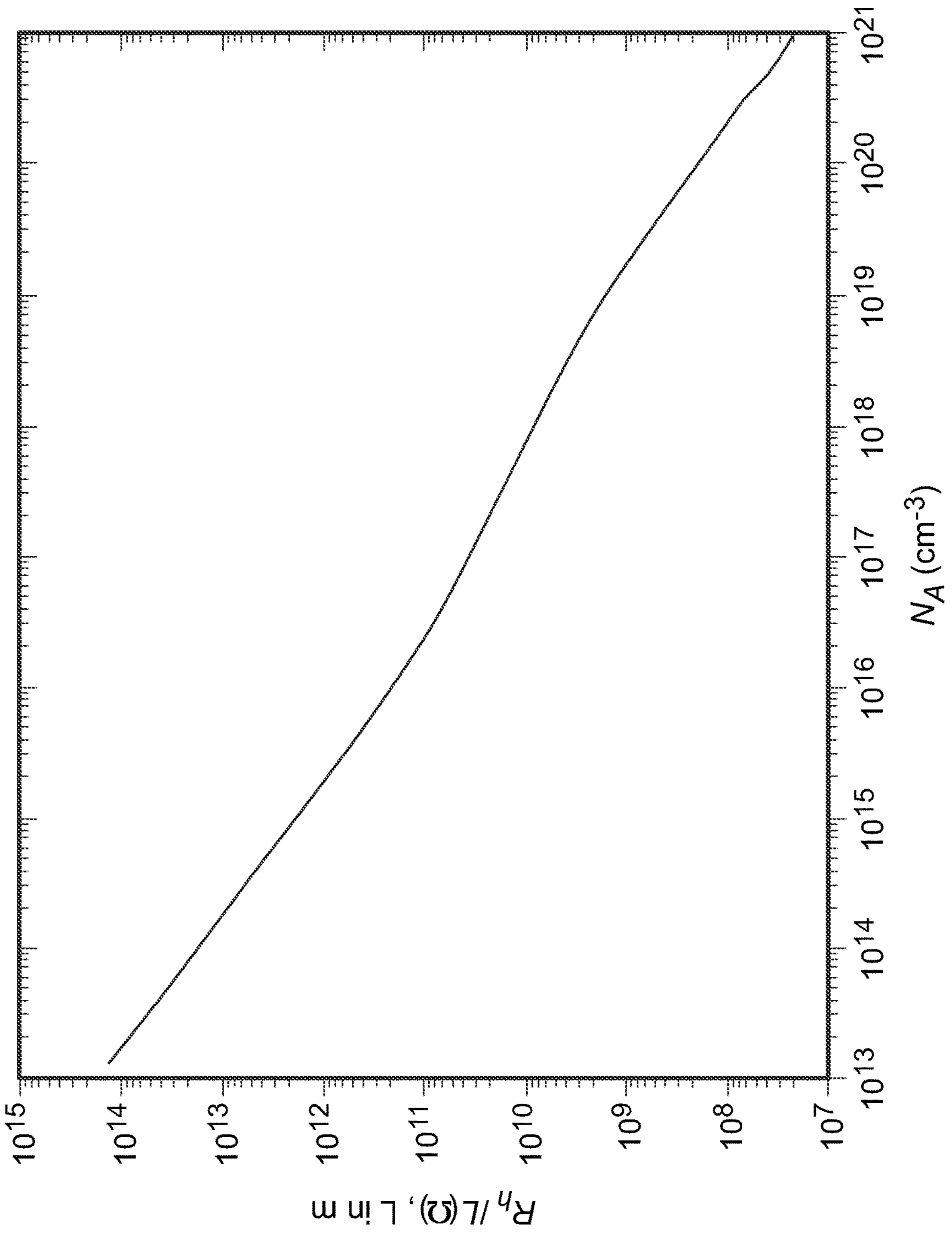
FIG. 20 depicts a plot of resistivity for a phase shifter in accordance with aspects of the disclosure.
Figure 21:
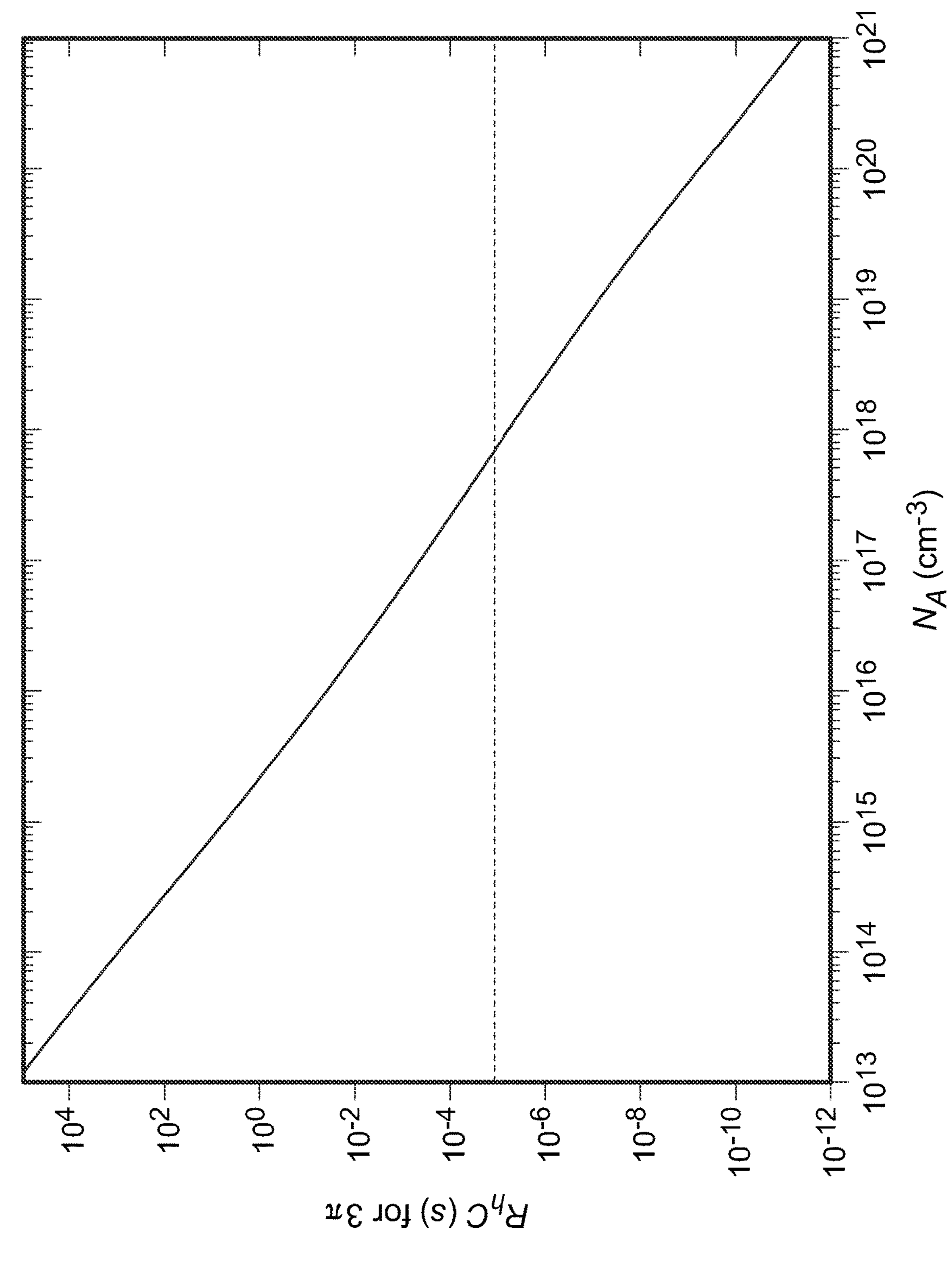
FIG. 21 depicts a plot of RC time constant for a phase shifter in accordance with aspects of the disclosure.

FIG. 20 depicts the resistivity ($R_h$) in ohms per unit of length where the length dimension L of the phase shifter is 3Lπ. As can be seen, this resistivity scales with the hole doping in the zero'th order approximation. FIG. 21 depicts a plot of the RC time constant in seconds for the phase shifter 500. This plot utilizes a PN junction width of 400 nm (optimum in the first order estimate), combined with the capacitance C (or $C_j$). A comparison may suggest that a different dopant with lower resistivity could increase the RC time constant.

Figure 22:
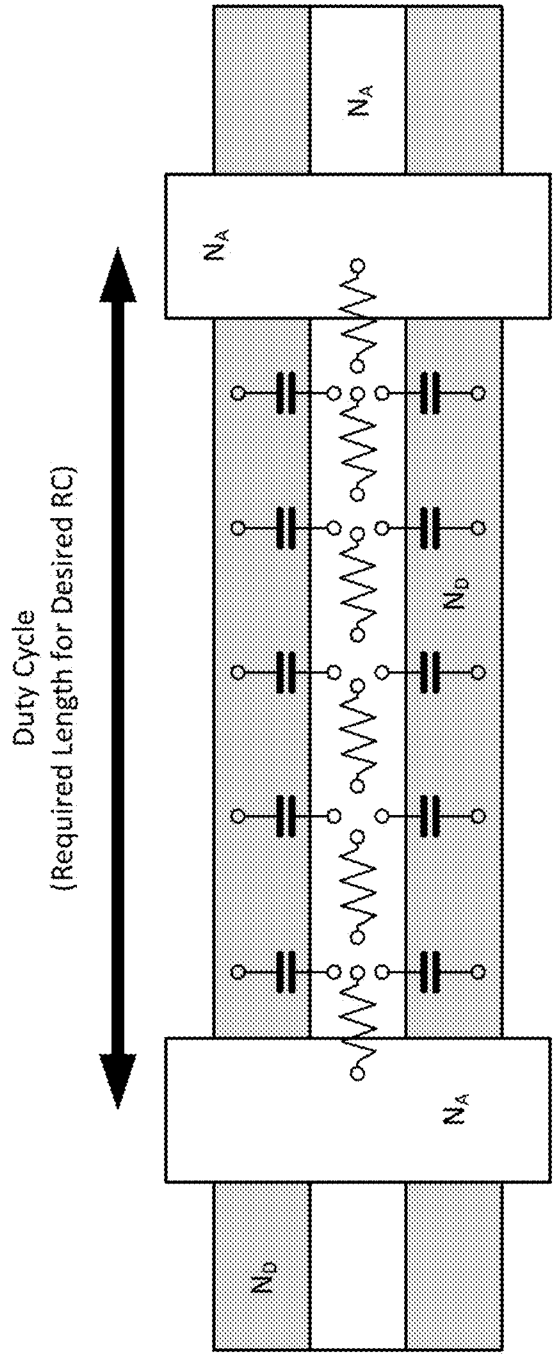
FIG. 22 depicts an example segmentation of a phase shifter into multiple electrically-contacted regions in accordance with aspects of the disclosure.

To recover the target switching bandwidth, the phase shifter 500 can be segmented into multiple electrically-contacted regions as depicted in FIG. 22. This essentially parallelizes the resistor. For instance, to recover 100 kHz switching time scale at $1\times10^{-17}$ $cm^{-3}$ hole density, the resistance needs to be divided by a factor of 10, leading to segments of approximately 1 mm in length. At $5\times10^{-16}$ cm-3 for the waveguide core width dimension, the segment may be closer to approximately 100 μm in length due to the increased resistance.

The area of the phase shifter 500 may be defined by the length dimension L and layout of the phase shifter. This area may be adjusted in order to fit the needs of and optimize the system (e.g., the OPA architecture or chip, communications terminal 102, 122, and/or communications system 100) in which the phase shifter is used. For instance, there is a limit on the proximity between neighboring waveguides determined by the amount of loss due to cross-coupling that can be tolerated in the phase shifter 500. Since this can be suppressed by mismatching the propagation constants of the neighboring waveguide, for instance by changing their relative waveguide core widths, this can also be included in the system-level optimization.

Figure 23A:
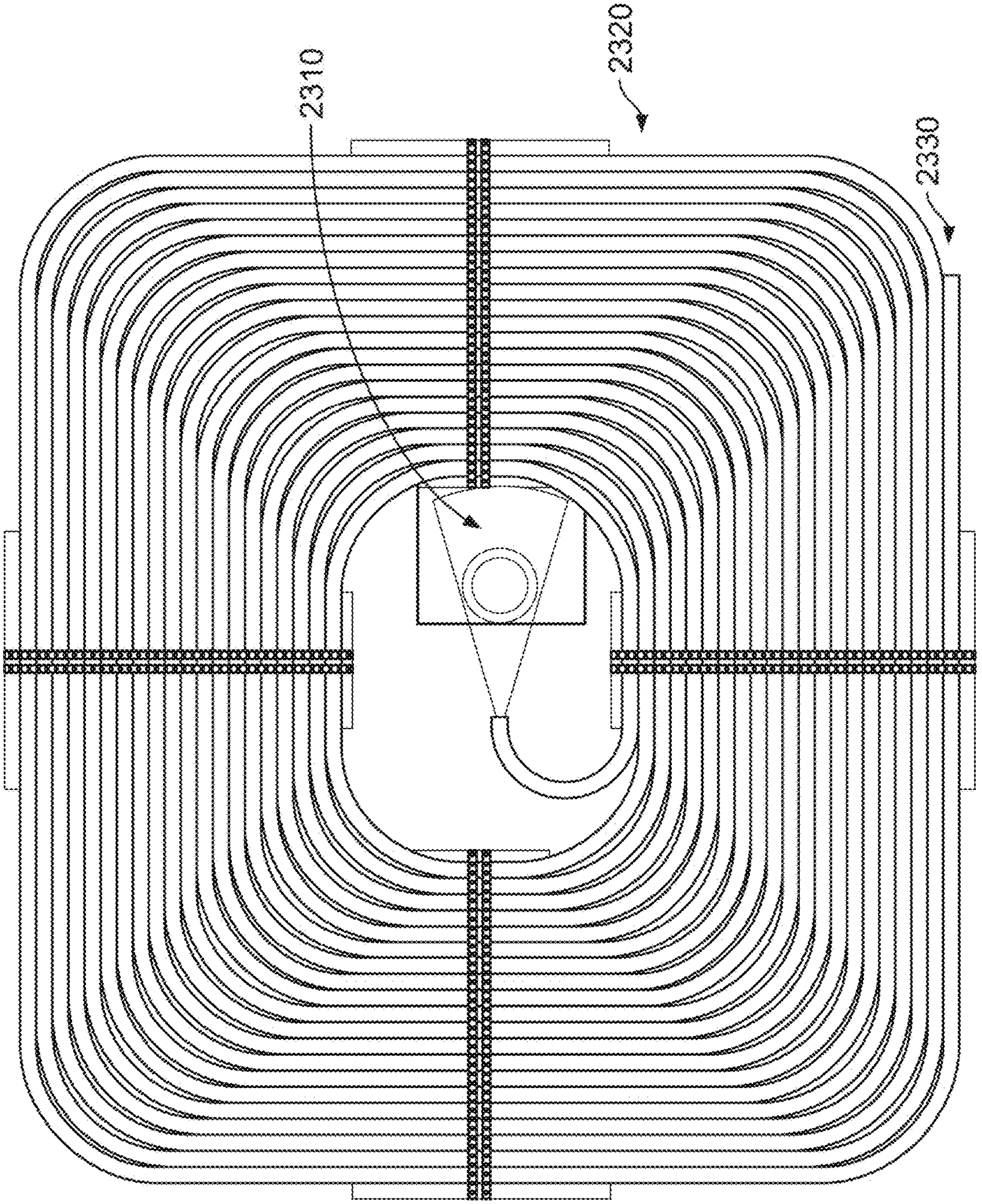
FIGS. 23A-23B provide example representative views of the architecture of a phase shifter in accordance with aspects of the disclosure.
Figure 23B:
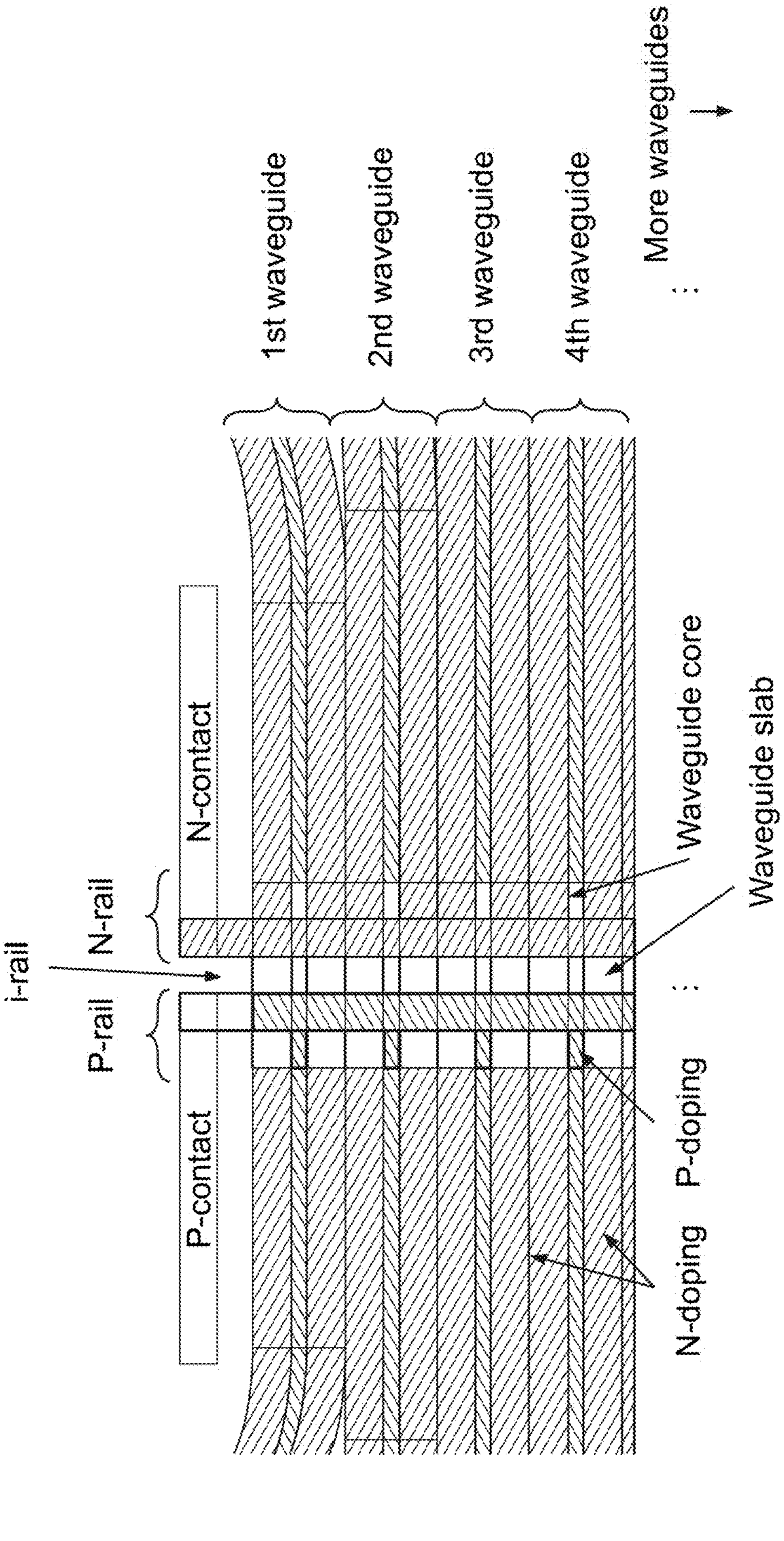

To further reduce area in the context of an optical phased array architecture such as OPA architecture 144, with regularly-spaced pixels and out-of-plane output (or input), a compact spiral structure 2300 as depicted in FIGS. 23A and 23B may be used. In this regard, FIG. 23A depicts an example arrangement of an antenna 2310, a coiled phase shifter 2320 (corresponding to phase shifter 500) and a waveguide input and output point 2330. FIG. 23B depicts a detail view of a portion of the coiled phase shifter including 4 waveguides.

A low-footprint contacting of the P and N regions of the phase shifter 500 can be achieved with "rails" that inject and/or remove charge carriers along the length of the waveguide for both P and N. This may allow for tight spacing between the waveguides of the coil which would otherwise be impossible if heavy doping and metal vias were inserted between each waveguide per typical approaches. Furthermore, heavy doping and higher numbers of vias close to the waveguides are likely to introduce additional optical loss. At the same time, due to waveguide proximity (e.g., the closeness of the first waveguide and second waveguides and so on), coupling between neighboring waveguides must be controlled, for instance by beta-mismatching them. In some instances, the rails may introduce some sections within the phase shifter with no index modulation.

With this layout, the pitch P of an array of the phase shifter 500 can be estimated as:

$$P \approx 2(R_0 + w_p N)$$

In this example, $R_0$ may correspond to the initial radius of the phase shifter 500 and $w_p$ may correspond to the waveguide pitch of the coiled phase shifter 2330. N may be the number of turns (coils) in the phase shifter and may be estimated from the total length L required for 3pi length modulation:

$$L \approx 4\sum_{n}^{N}(R_0 + nw_p) - R_{bend}$$

Figure 24:
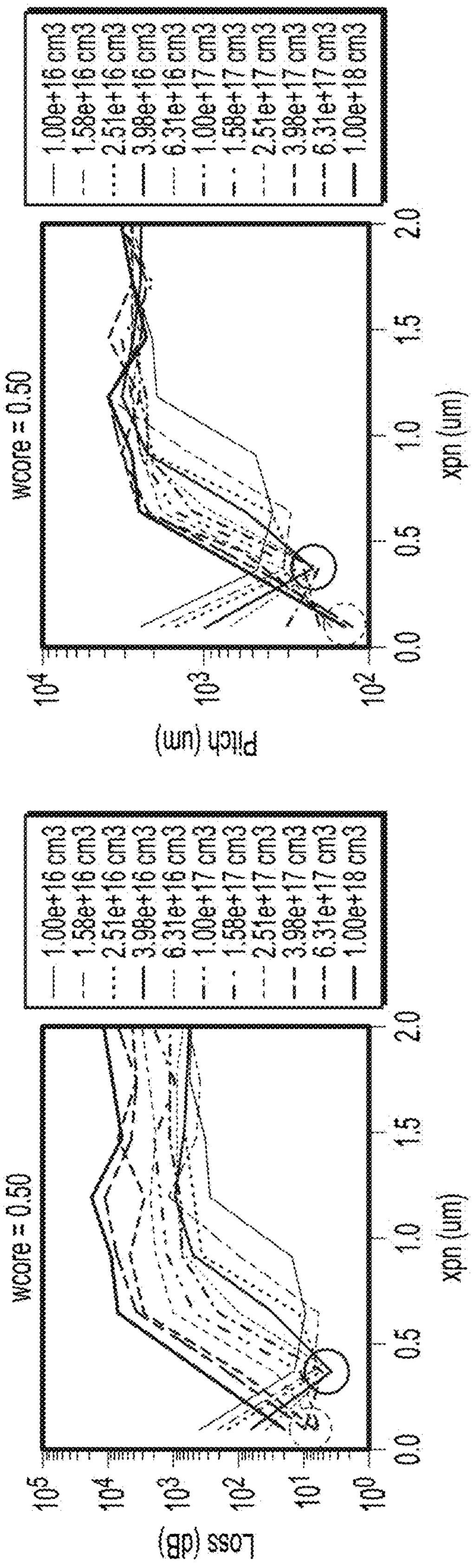
FIG. 24 depicts plots of effective refractive index and absorption coefficient for a plurality of different wavelengths for a phase shifter in accordance with aspects of the disclosure.
Figure 25:
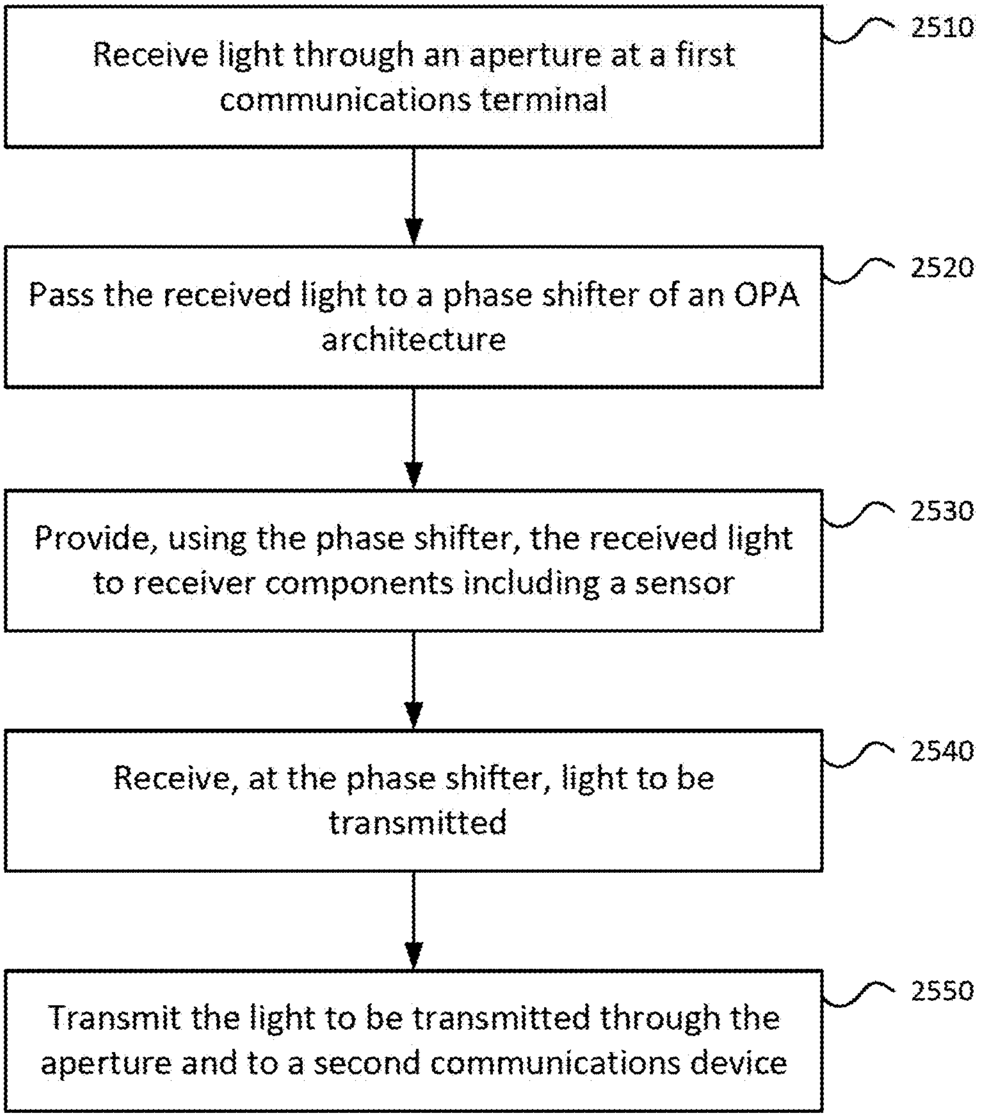
FIG. 25 is a flow diagram in accordance with aspects of the disclosure.

In this example, $R_{bend}$ may correspond to the end radius of the spiral bends of the phase shifter 500. This can be computed for the same set of parameters as in FIG. 12, and may allow for the observation of a tradeoff between phase shifter loss and antenna pitch. For instance, as shown in FIG. 24, for the best case geometry for either loss (solid circle) or pitch (dashed circle), an additional 3 dB loss can be introduced to reduce the pitch by 30%:

Example Methods

In operation, the one or more processors 104 may perform wavefront sensing and/or correction for optical communication. In FIG. 23, flow diagram 2300 is shown in accordance with some of the aspects described above that may be performed by the one or more processors 104 of the first communication device 102. Additionally, or alternatively, the one or more processors 124 of the second communication device 122 may perform one or more steps of the flow diagram 2300. While FIG. 23 shows blocks in a particular order, the order may be varied and that multiple operations may be performed simultaneously. Also, operations may be added or omitted.

In this example, at block 2310, a first communications terminal receives light through an aperture. For instance, this first communications terminal may be the communications terminal 104. At block 2320, the received light is passed to a phase shifter of an OPA architecture, such as OPA architecture 114. The phase shifter may be configured as described above with regard to phase shifter 500. At block 2330, the phase shifter provides the received light to receiver components including a sensor, such as sensor 118. At block 2340, the phase shifter also receives light to be transmitted. At block 2350, the light to be transmitted is transmitting through the aperture and to a second communications terminal, such as communications terminal 122.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system including:

an antenna and a phase shifter consisting of silicon, the phase shifter having:

a slab portion, and a rib portion protruding from the slab portion, each of the rib portion and the slab portion having an NPN junction scheme geometry such that the phase shifter has a pair of N-type material regions with a P-type material region arranged completely therebetween as a waveguide core, wherein the waveguide core extends from one end of the rib portion through the slab portion, wherein the phase shifter is arranged as a spiraled structure having a plurality of coils, the plurality of coils being arranged around the antenna and the plurality of coils extending between the antenna and a common input and output of the phase shifter for light to enter to exit and enter the phase shifter.

2. The system of claim 1, wherein the phase shifter is configured to operate under depletion modulation.

3. The system of claim 1, wherein the phase shifter includes a maximum optical loss on the order of 3 dB (decibels) or less.

4. The system of claim 1, wherein the phase shifter has a doping density in a range of $10^{16}$ $cm^{-3}$ to $10^{17}$ $cm^{-3}$.

5. The system of claim 1, wherein the phase shifter has a dynamic switching energy of the phase shifter is less than 0.1 mWatt.

6. The system of claim 1, wherein the phase shifter has an acceptor concertation $N_A$ which ranges from $10^{16}$ to $10^{18}$ $cm^{-3}$ inclusive.

7. The system of claim 6, wherein the system has a donor concentration $N_D$ which ranges from $10^{16}$ to $10^{18}$ $cm^{-3}$, inclusive.

8. The system of claim 1, wherein the phase shifter is symmetrical.

9. The system of claim 1, wherein the slab portion includes a pair of opposing edges each formed from one of the pair of N-type material regions.

10. The system of claim 1, wherein the waveguide core has a waveguide core width dimension within a range 500 nm to 2 μm, inclusive.

11. The system of claim 1, wherein the phase shifter is segmented into multiple electrically-contacted regions.

12. A system comprising:

a first communications terminal comprising:

an optical phased array (OPA) architecture including an antenna and plurality of phase shifters configured to receive an optical communications beam from a second optical communications terminal, wherein the plurality of phase shifters includes a first phase shifter consisting of silicon, the first phase shifter having:

a slab portion; and a rib portion protruding from the slab portion, each of the rib portion and the slab portion having an NPN junction scheme geometry such that the phase shifter has a pair of N-type material regions with a P-type material region arranged completely therebetween as a waveguide core, wherein the waveguide core extends from one end of the rib portion through the slab portion, wherein the waveguide core has a waveguide core width dimension within a range 500 nm to 2 μm, inclusive, wherein the phase shifter is arranged as a spiraled structure having a plurality of coils, the plurality of coils being arranged around the antenna and the plurality of coils extending between the antenna and a common input and output of the phase shifter for light to enter to exit and enter the phase shifter.

13. The system of claim 12, further comprising the second optical communications terminal, the second optical communications terminal having a second OPA architecture including a plurality of phase shifters configured to send and receive an optical communications beam from the first communications terminal, wherein the plurality of phase shifters includes a second phase shifter consisting of silicon.

14. The system of claim 13, wherein the second phase shifter has a PN junction distance from waveguide center within a range 100 nm to 2 μm, inclusive and a waveguide core width dimension within a range 500 nm to 2 μm, inclusive.

15. The system of claim 12, wherein the pair of N-type material regions of the rib portion each have a PN junction distance from waveguide center within a range 100 nm to 2 μm, inclusive.

16. The system of claim 12, wherein the first phase shifter is symmetrical.

17. The system of claim 12, wherein the slab portion includes a pair of opposing edges each formed from one of the pair of N-type material regions.

* * * * *